(12) United States Patent
Sun et al.

(10) Patent No.: US 11,540,188 B2
(45) Date of Patent: Dec. 27, 2022

(54) TERMINAL ROAMING STEERING METHOD AND DEVICES, AND COMPUTER-READABLE STORAGE MEDIUM

(71) Applicant: Huawei Technologies Co., Ltd., Shenzhen (CN)

(72) Inventors: Fuqing Sun, Shenzhen (CN); Zhi Ma, Suzhou (CN); Xiaofei Bai, Suzhou (CN); Dewei Bao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/244,263

(22) Filed: Apr. 29, 2021

(65) Prior Publication Data

US 2021/0345207 A1 Nov. 4, 2021

(30) Foreign Application Priority Data

Apr. 30, 2020 (CN) .......................... 202010366188.7

(51) Int. Cl.
*H04W 4/00* (2018.01)
*H04W 36/08* (2009.01)
*H04W 8/02* (2009.01)
*H04W 36/14* (2009.01)
*H04W 36/32* (2009.01)

(52) U.S. Cl.
CPC ............. *H04W 36/08* (2013.01); *H04W 8/02* (2013.01); *H04W 36/14* (2013.01); *H04W 36/32* (2013.01)

(58) Field of Classification Search
CPC ....... H04W 36/08; H04W 8/02; H04W 36/14; H04W 36/32; H04W 36/30; H04W 36/34; H04W 40/36; H04W 84/12; H04W 24/02; H04W 24/08
USPC .......................................... 370/331; 455/312
See application file for complete search history.

(56) References Cited

U.S. PATENT DOCUMENTS

| 2017/0006495 | A1 | 1/2017 | Agarwal et al. |
| 2017/0135145 | A1 | 5/2017 | Amini et al. |
| 2017/0272317 | A1 | 9/2017 | Singla et al. |
| 2018/0295538 | A1 | 10/2018 | Monajemi et al. |
| 2018/0310240 | A1 | 10/2018 | Kannan |
| 2019/0075469 | A1* | 3/2019 | Mahoney ............. H04B 17/318 |

FOREIGN PATENT DOCUMENTS

| CN | 109788519 A | * | 5/2019 |
| JP | 2019509703 A | | 4/2019 |

* cited by examiner

*Primary Examiner* — Marcos Batista
(74) *Attorney, Agent, or Firm* — Conley Rose, P.C.

(57) ABSTRACT

In a terminal roaming steering method, a steering protocol supported by a terminal and a second AP are determined, and the terminal is steered, based on the steering protocol supported by the terminal, to roam from a first AP to the second AP.

20 Claims, 7 Drawing Sheets

TERMINAL ROAMING STEERING METHOD AND DEVICES, AND COMPUTER-READABLE STORAGE MEDIUM

CROSS-REFERENCE TO RELATED APPLICATIONS

This claims priority to Chinese Patent App. No. 202010366188.7, filed on Apr. 30, 2020, which is incorporated by reference.

FIELD

This disclosure relates to the field of network communications technologies, and in particular, to a terminal roaming steering method and apparatus, a device, and a computer-readable storage medium.

BACKGROUND

In a wireless local area network (WLAN), an access point (AP) may actively steer a terminal based on a signal strength of the terminal and by using a steering protocol in a Wi-Fi standard to implement terminal roaming.

Currently, a steering process of the terminal roaming may be as follows: For any terminal associated with the AP, when the AP detects that a signal strength of the terminal is relatively low, the AP may use the Institute of Electrical and Electronics Engineers (IEEE) 802.11v protocol and the de-authentication (deauth) protocol that are in the Wi-Fi standards, to attempt to steer the terminal to roam from the AP to a target AP. Specifically, the AP may first use the IEEE 802.11v protocol to attempt to steer the terminal to perform roaming. If the terminal roams from the AP to the target AP through this steering, to be specific, the terminal disconnects association with the AP and establishes association with the target AP, the terminal roaming succeeds, and the steering ends. If the terminal does not roam from the AP to the target AP through this steering, the steering fails. In this case, the AP uses the IEEE 802.11v protocol to steer the terminal to perform roaming again. If three times of roaming steering performed by using the IEEE 802.11v protocol all fail, the AP may further attempt to use the deauth protocol to steer the terminal to perform roaming again. Whether the steering succeeds or fails, the steering ends.

The IEEE 802.11v protocol and the deauth protocol are not necessarily steering protocols supported by the terminal. Therefore, a steering failure often occurs in the steering process of the terminal roaming, resulting in a low success rate of the terminal roaming.

SUMMARY

Embodiments provide a terminal roaming steering method and apparatus, a device, and a computer-readable storage medium, to increase a success rate of terminal roaming. Technical solutions are as follows:

According to a first aspect, a terminal roaming steering method is provided. The method includes: determining a steering protocol supported by a terminal; determining a second AP from at least one neighboring AP of the first AP; and steering, based on the steering protocol, the terminal to roam from the first AP to the second AP.

In the method, the steering protocol supported by the terminal and the second AP are determined, and the terminal is steered, based on the steering protocol supported by the terminal, to roam from the first AP to the second AP, to increase a success rate of terminal roaming.

In a possible implementation, the determining a second AP from at least one neighboring AP of the first AP includes: for any neighboring AP in the at least one neighboring AP, when a network status of the first AP and a network status of the neighboring AP meet a network status indicated by network selection reference information of the terminal, determining the neighboring AP as the second AP, where the network selection reference information is used to indicate network statuses that the first AP and the second AP need to meet when the terminal performs roaming.

Based on the foregoing possible implementation, the second AP is determined based on the network status of the first AP, a network status of the at least one neighboring AP, and the network selection reference information of the terminal, to prevent the determined second AP from not meeting a requirement of the network selection reference information, so as to further increase the success rate of terminal roaming.

In a possible implementation, before the determining a second AP from at least one neighboring AP of the first AP, the method further includes: obtaining network information of the first AP and network information of the at least one neighboring AP, where network information of one AP is used to indicate a network status of the AP.

In a possible implementation, the obtaining network information of the first AP and network information of the at least one neighboring AP includes: sending an information obtaining request to each of the first AP and the at least one neighboring AP; and receiving the respective network information sent by the first AP and the at least one neighboring AP based on the information obtaining request; where the information obtaining request is used to indicate the AP to return the network information to a control node.

In a possible implementation, the information obtaining request includes address information of the terminal and an identifier of a signal measurement protocol supported by the terminal, and the signal measurement protocol is used to measure a signal strength between the AP and the terminal.

In a possible implementation, the information obtaining request further includes a basic service set identifier BSSID of the first AP and an identifier of a channel of the first AP.

In a possible implementation, the information obtaining request further includes a target quantity of measurement times, and the target quantity of measurement times is a quantity of times that measurement needs to be performed.

In a possible implementation, the steering, based on the steering protocol, the terminal to roam from the first AP to the second AP includes: steering the terminal to roam from the first AP to the second AP based on a parameter value that is of at least one target steering parameter in the steering protocol and that is applicable to the terminal.

In a possible implementation, before the determining a second AP from at least one neighboring AP of the first AP, the method further includes: generating a roaming steering behavior feature of the terminal based on at least one of the steering protocol, the parameter value that is of the at least one target steering parameter and that is applicable to the terminal, the signal measurement protocol supported by the terminal, and the network selection reference information, where the roaming steering behavior feature is used to indicate a behavior feature of the terminal during roaming.

In a possible implementation, after the generating a roaming steering behavior feature of the terminal, the method further includes: determining, based on the roaming steering behavior feature, a roaming occasion for steering the terminal to perform roaming.

In a possible implementation, before the generating a roaming steering behavior feature of the terminal, the method further includes: determining at least one of the parameter value that is of the at least one target steering parameter and that is applicable to the terminal, the signal measurement protocol, and the network selection reference information.

In a possible implementation, the determining the parameter value that is of the at least one target steering parameter and that is applicable to the terminal includes: when a success rate of steering the terminal to complete roaming is greater than or equal to a target threshold based on a target parameter value set of the at least one target steering parameter, determining a target parameter value of each target steering parameter in the target parameter value set as a parameter value that is of each target steering parameter and that is applicable to the terminal, where the target parameter value set includes a target parameter value of each of the at least one target steering parameter.

In a possible implementation, before sending a roaming steering instruction to the first access point AP, the method further includes: obtaining a motion state of the terminal and/or a service type of a service currently performed by the terminal; and determining, based on the motion state of the terminal and/or the service type of the service currently performed by the terminal, that the terminal needs to perform roaming.

In a possible implementation, the determining, based on the motion state of the terminal and the service type of the service currently performed by the terminal, that the terminal needs to perform roaming includes: when the motion state of the terminal indicates that the terminal is moving away from the first AP, and/or the service type of the service currently performed by the terminal is a target service type, determining that the terminal needs to perform roaming.

Based on the foregoing possible implementation, whether the terminal needs to perform roaming is determined based on the motion state of the terminal and the service type of the service currently performed by the terminal. The terminal is steered to perform roaming only when the terminal needs to perform roaming, to avoid impact of terminal roaming on a service performed by the terminal, so as to improve experience of a terminal user.

In a possible implementation, the method is executed by the control node, and the steering, based on the steering protocol, the terminal to roam from the first AP to the second AP includes: sending the roaming steering instruction to the first AP, where the roaming steering instruction is used to instruct the first AP to steer, based on the steering protocol, the terminal to roam from the first AP to the second AP.

In a possible implementation, the roaming steering instruction includes the parameter value that is of the at least one target steering parameter in the steering protocol and that is applicable to the terminal.

In a possible implementation, the roaming steering instruction further includes an identifier of the second AP, an identifier of the steering protocol, and the address information of the terminal.

In a possible implementation, the roaming steering instruction further includes network information of the second AP.

In a possible implementation, before the determining a second AP from at least one neighboring AP of the first AP, the method further includes: sending the information obtaining request to each of the first AP and the at least one neighboring AP, where the information obtaining request includes the address information of the terminal and the identifier of the signal measurement protocol supported by the terminal, and the signal measurement protocol is used to measure the signal strength between the AP and the terminal; and receiving the respective network information sent by the first AP and the at least one neighboring AP based on the information obtaining request.

In a possible implementation, the method is executed by the first AP.

In a possible implementation, the network selection reference information includes at least one of signal strength reference information, load reference information, frequency band reference information, and bandwidth reference information. The signal strength reference information includes at least one of a source signal strength threshold, a target signal strength threshold, and a target signal strength difference. The target signal strength threshold is greater than or equal to the source signal strength threshold. The load reference information includes at least one of target channel utilization, a target channel utilization difference, and a target quantity of associated terminals. The frequency band reference information includes at least one of a target frequency band and a target frequency band range. The bandwidth reference information includes at least one of a target channel bandwidth and a target channel bandwidth range.

In a possible implementation, network information of one AP includes at least one of a signal strength between the AP and the terminal, channel utilization of the AP, a frequency band of the AP, a quantity of terminals associated with the AP, and a channel bandwidth of the AP.

In a possible implementation, when the network status of the first AP and the network status of the neighboring AP meet at least one of the following, the network status of the first AP and the network status of the neighboring AP meet the network status indicated by the network selection reference information: a signal strength between the first AP and the terminal is less than or equal to the source signal strength threshold, and/or a signal strength between the neighboring AP and the terminal is greater than or equal to the target signal strength threshold; a signal strength between the first AP and the terminal is less than or equal to the source signal strength threshold, and a difference between a signal strength between the neighboring AP and the terminal and the signal strength between the first AP and the terminal is greater than or equal to the target signal strength difference; channel utilization of the neighboring AP is less than or equal to the target channel utilization; a signal strength between the neighboring AP and the terminal is greater than or equal to a signal strength between the first AP and the terminal, and a difference between channel utilization of the neighboring AP and channel utilization of the first AP is greater than or equal to the target channel utilization difference; a quantity of terminals connected to the neighboring AP is less than or equal to the target quantity of associated terminals; a frequency band of the first AP is less than or equal to the target frequency band, and a frequency band of the neighboring AP is greater than the target frequency band; a signal strength between the neighboring AP and the terminal is greater than or equal to a signal strength between the first AP and the terminal, and a frequency band range between a frequency band of the neighboring AP and a frequency band of the first AP is greater than or equal to the target frequency band range; a channel bandwidth of the first AP is less than or equal to the target channel bandwidth, and a channel bandwidth of the neighboring AP is greater than the target channel bandwidth; or a signal strength between the neighboring AP and the terminal is greater than or equal to a signal strength between the first AP and the terminal, and a channel bandwidth range between a channel bandwidth of the neighboring AP and a channel bandwidth of the first AP is greater than or equal to the target channel bandwidth range.

According to a second aspect, a terminal roaming steering apparatus is configured to perform the foregoing terminal roaming steering method. Specifically, the terminal roaming steering apparatus includes function modules configured to perform the terminal roaming steering method provided in any one of the first aspect or the optional manners of the first aspect.

According to a third aspect, a control device is provided. The control device includes a processor and a memory. The memory stores at least one instruction, and the instruction is loaded and executed by the processor to implement an operation performed in the terminal roaming steering method provided in any one of the first aspect or the optional manners of the first aspect.

According to a fourth aspect, a network device is provided. The network device includes a processor and a memory. The memory stores at least one instruction, and the instruction is loaded and executed by the processor to implement an operation performed in the terminal roaming steering method provided in any one of the first aspect or the optional manners of the first aspect.

According to a fifth aspect, a computer-readable storage medium is provided. The storage medium stores at least one instruction, and the instruction is loaded and executed by a processor to implement an operation performed in the foregoing terminal roaming steering method.

BRIEF DESCRIPTION OF THE DRAWINGS

To describe the technical solutions in the embodiments more clearly, the following briefly describes the accompanying drawings for describing the embodiments. The accompanying drawings in the following descriptions show merely some embodiments, and a person of ordinary skill in the art may further derive other accompanying drawings from these accompanying drawings without creative efforts.

DETAILED DESCRIPTION

To make the objectives, technical solutions, and advantages clearer, the following further describes the implementations in detail with reference to the accompanying drawings.

Figure 1:
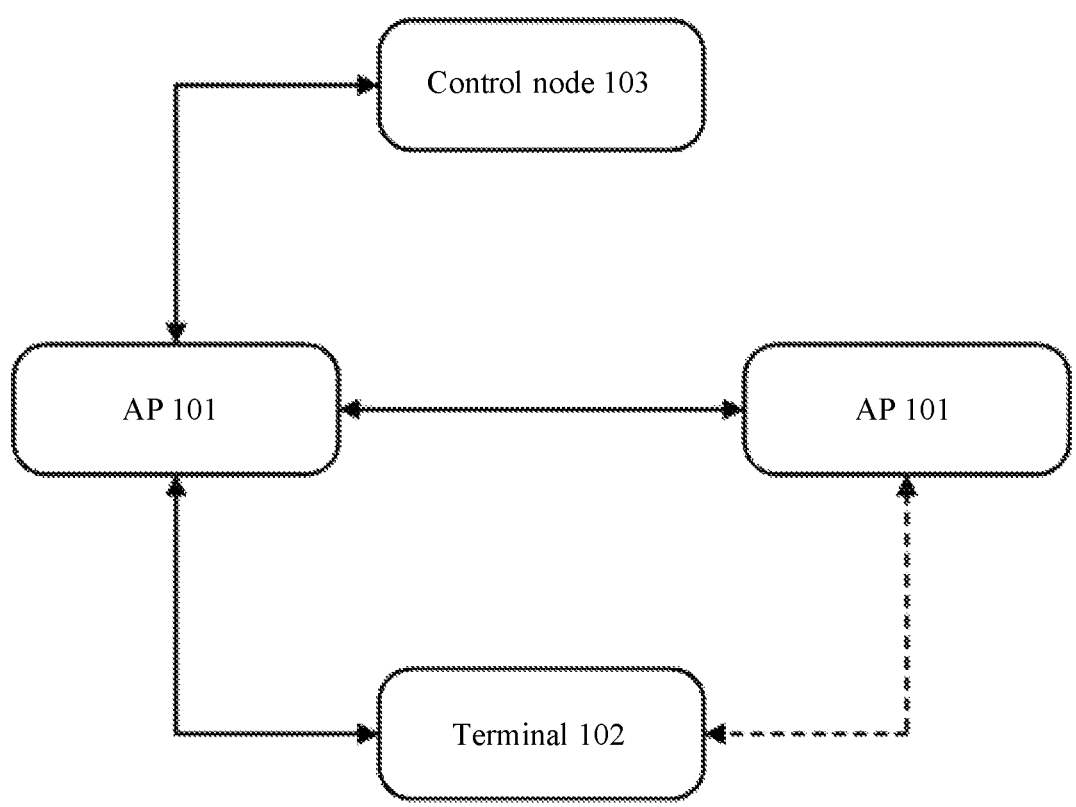
FIG. 1 is a schematic diagram of a terminal roaming steering system according to an embodiment.

FIG. 1 is a schematic diagram of a terminal roaming steering system according to an embodiment. Referring to FIG. 1, the system 100 includes a plurality of APs 101, a plurality of terminals (STAs) 102, and a control node 103. A WLAN may be covered in the system 100.

Any AP 101 in the plurality of APs 101 is configured to connect at least one terminal 102, and may provide a network service, for example, a channel or a Wi-Fi signal, for each connected terminal 102. The AP 101 is further configured to measure a signal strength between the AP 101 and the terminal 102 connected to the AP 101, and report network information to the control node 103 based on the measured signal strength. The AP 101 is further configured to report a motion state of the connected terminal 102 to the control node 103, and trigger a neighboring AP of the AP 101 to report network information of the neighboring AP to the control node. The AP 101 is further configured to measure a signal strength between the AP 101 and a terminal 102 connected to the neighboring AP, and report network information to the control node based on the measured signal strength. The AP 101 is further configured to receive a roaming steering instruction delivered by the control node 103, and steer, according to the received roaming steering instruction, the terminal connected to the AP 101 to perform roaming.

Any terminal 102 in the plurality of terminals 102 is configured to measure, based on a signal measurement protocol, a downlink signal delivered by a connected AP 101, to obtain a signal strength between the terminal 102 and the connected AP 101, and report the signal strength between the terminal 102 and the connected AP 101 to the AP 101. The terminal 102 is further configured to receive a roaming steering packet delivered by the connected AP, and roam from a currently connected AP 101 to another AP 101 based on the roaming steering packet. The terminal 102 may be an electronic device, for example, a mobile phone, an intelligent wearing device, a tablet computer, or a notebook computer, having a Wi-Fi wireless interface.

Figure 2:
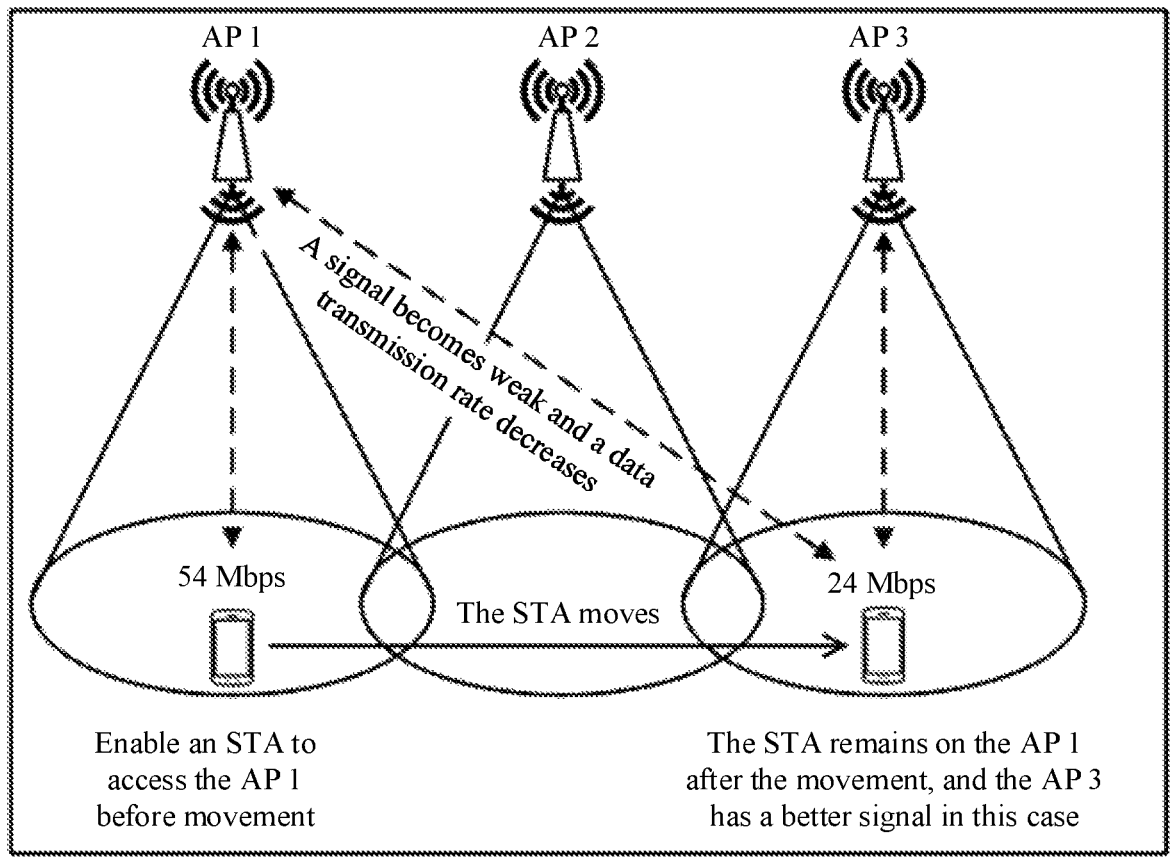
FIG. 2 is a schematic diagram of AP distribution according to an embodiment.

It should be noted that a Wi-Fi signal provided by each AP 101 has a specific coverage area, and the coverage area may include a core coverage area and a non-core coverage area. When one terminal is located in a core coverage area of one AP 101, it is considered that a signal strength between the terminal and the AP is high. When the terminal is moving away from the core coverage area of the AP 101 and is located in a non-core coverage area of the AP, it is considered that the signal strength between the terminal and the AP is low. When the signal strength between the terminal and the AP is low to some extent, poor experience is brought to a terminal user. Therefore, when a signal strength between the terminal and another AP is relatively high, the terminal may roam from a currently connected AP to the another AP, and the another AP provides a Wi-Fi signal for the terminal, to avoid bringing the poor experience to the terminal user. For example, FIG. 2 is a schematic diagram of AP distribution according to an embodiment. In FIG. 2, a terminal STA is connected to an AP 1 before movement, moves from a core coverage area of the AP 1 to a core coverage area of an AP 2, and moves to a core coverage area of an AP 3 after passing through the core coverage area of the AP 2. If the terminal is always connected to the AP 1 in a moving process, as the terminal moves, the terminal is moving away from the core coverage area of the AP 1, and a transmission distance of a Wi-Fi signal sent by the AP 1 also increases accordingly. Consequently, a signal strength of the Wi-Fi signal reaching the terminal is reduced. That is, the signal is degraded, and a data transmission rate decreases. As the terminal moves, a signal strength between the terminal and the AP 1 decreases from 54 Mbps to 24 Mbps. When the terminal enters the core coverage area of the AP 3, a signal strength between the terminal and the AP 3 is high. If the terminal disconnects a wireless connection to the AP 1 and is connected to the AP 3, that is, the terminal roams from the AP 1 to the AP 3, the AP 3 provides a Wi-Fi signal for the terminal. Because a signal strength of the Wi-Fi signal provided by the AP 3 is relatively high, the poor experience brought to the terminal user can be avoided.

The control node 103 is configured to generate a roaming steering behavior feature of each terminal 102, where the roaming steering behavior feature is used to indicate a behavior feature of the terminal 102 during roaming. For any terminal 102, the control node 103 is further configured to determine, based on a motion state of the terminal 102, whether the terminal 102 needs to perform roaming. When the terminal 102 needs to perform roaming, the control node 103 may further determine, based on a roaming steering behavior feature, network information of an AP currently connected to the terminal 102, and network information of at least one neighboring AP of the AP currently connected to the terminal 102, whether the terminal can perform roaming based on steering. If the terminal can perform roaming based on the steering, the control node 103 may deliver a roaming steering instruction to the AP currently connected to the terminal 102. The control node may be a server. The server may be an independent physical server, or may be a server cluster or a distributed system including a plurality of physical servers, or may be a cloud server that provides a cloud computing service.

It should be noted that, in a possible implementation, all or some of functions of the control node 103 may alternatively be implemented on the AP 101. For example, the control node 103 is only responsible for generating the roaming steering behavior feature of each terminal 102, and delivering the roaming steering behavior feature of each terminal 102 to each AP 101. The AP 101 determines, based on a motion state of the terminal 102 connected to the AP 101, whether the terminal 102 needs to perform roaming. When the terminal 102 needs to perform roaming, the AP 101 may further determine, based on a roaming steering behavior feature of the terminal 102, network information of the terminal 102, and network information of at least one neighboring AP, whether the terminal 102 can perform roaming based on steering (in other words, determine whether the terminal 120 can accept the steering). If the terminal can perform roaming based on the steering, the AP 101 may send a roaming steering packet to the terminal 102 to steer the terminal 102 to perform roaming.

Figure 3:
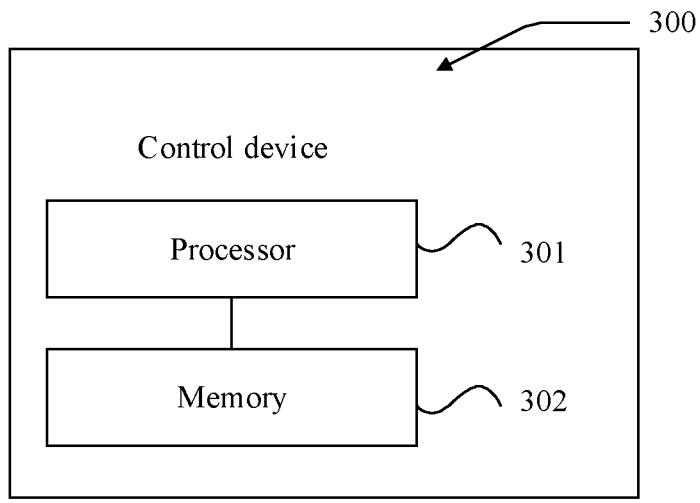
FIG. 3 is a schematic structural diagram of a control device according to an embodiment.

The control node may be a control device shown in FIG. 3. FIG. 3 is a schematic structural diagram of a control device according to an embodiment. The control device 300 may vary greatly due to different configurations or different performance, and may include one or more processors (e.g., central processing units (CPUs)) 301 and one or more memories 302. The memory 302 stores at least one instruction, and the at least one instruction is loaded and executed by the processor 301 to implement steps performed by the control node in the methods provided in the following method embodiments. Certainly, the control device 300 may further include components such as a wired or wireless network interface, a keyboard, and an input/output interface, to perform input/output. The control device 300 may further include another component configured to implement a device function. Details are not described herein.

Figure 4:
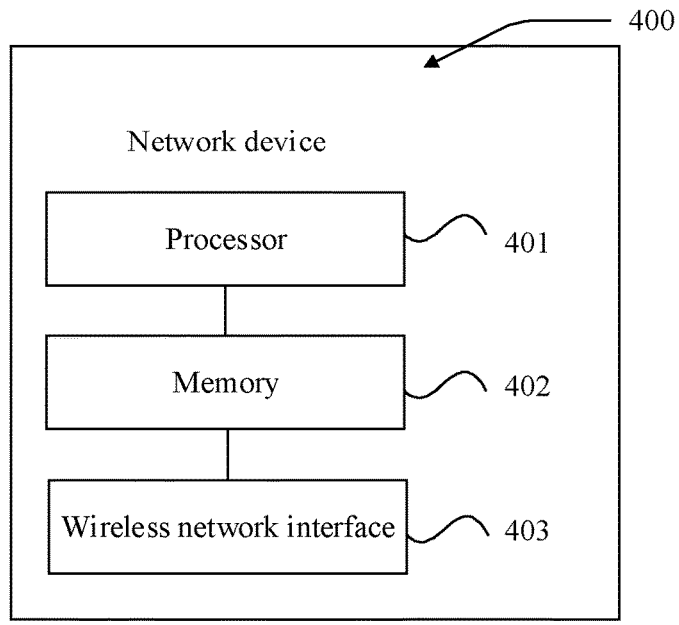
FIG. 4 is a schematic structural diagram of a network device according to an embodiment.

The AP may be a network device shown in FIG. 4. FIG. 4 is a schematic structural diagram of a network device according to an embodiment. The network device 400 may vary greatly due to different configurations or different performance, and may include one or more processors (e.g., CPUs) 401 and one or more memories 402. The memory 402 stores at least one instruction, and the at least one instruction is loaded and executed by the processor 401 to implement steps performed by the AP in the methods provided in the following method embodiments. Certainly, the network device 400 may further include a wired or wireless network interface 403, and may further include components such as an input/output interface, to perform input/output. The network device 400 may further include another component configured to implement a device function. Details are not described herein.

In an example embodiment, a computer-readable storage medium is further provided, for example, a memory including an instruction. The instruction may be executed by a processor in a control device or a network device, to complete the terminal roaming steering methods in the following embodiments. For example, the computer-readable storage medium may be a read-only memory (ROM), a random-access memory (RAM), a compact disc ROM (CD-ROM), a magnetic tape, a floppy disk, an optical data storage device, and the like.

Figure 5:
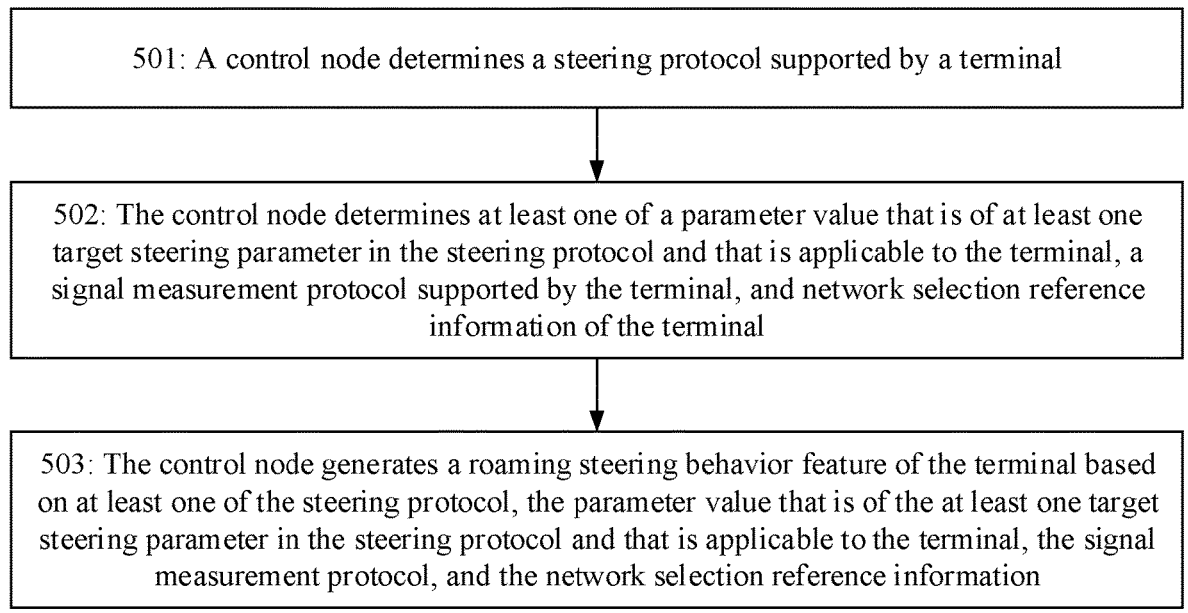
FIG. 5 is a flowchart of obtaining a roaming steering behavior feature of a terminal according to an embodiment.

Before performing roaming steering on the terminal, the control node may first obtain roaming steering behavior features of a plurality of terminals, where the roaming steering behavior feature of the terminal is used to indicate a behavior feature of the terminal during roaming, for example, which steering protocols are supported by the terminal, which signal measurement protocols are supported by the terminal, and which requirements are imposed on a network status when the terminal performs roaming, so that subsequently, the control node can steer, based on a roaming behavior feature of each terminal, the corresponding terminal to perform roaming. FIG. 5 is a flowchart of obtaining a roaming steering behavior feature of a terminal according to an embodiment.

501: A control node determines a steering protocol supported by the terminal.

The terminal is any terminal, and the steering protocol supported by the terminal may be a standard steering protocol, for example, the IEEE 802.11v protocol, the deauth protocol, and the channel switch announcement (CSA) protocol. Certainly, the terminal may further support a non-standard steering protocol, for example, a steering protocol in a Huawei proprietary protocol (e.g., Huawei HiLink). Different terminals may have different steering protocols or a same steering protocol. The steering protocol supported by the terminal is not specifically limited in this embodiment.

A skilled person may test the steering protocol supported by the terminal to obtain the steering protocol supported by the terminal. After determining the steering protocol supported by the terminal, the skilled person may input an identifier of the steering protocol supported by the terminal on a roaming steering behavior feature generation interface of the control node. After the control node detects that the skilled person uploads the identifier of the steering protocol supported by the terminal on the interface, the control node may be triggered to obtain the identifier that is of the steering protocol supported by the terminal and that is uploaded by the skilled person, so that the control node can determine the steering protocol supported by the terminal based on the uploaded identifier of the steering protocol.

502: The control node determines at least one of a parameter value that is of at least one target steering parameter in the steering protocol and that is applicable to the terminal, a signal measurement protocol supported by the terminal, and network selection reference information of the terminal.

The at least one target steering parameter is a steering parameter specified when the terminal performs roaming based on the steering protocol supported by the terminal. The at least one target steering parameter in different steering protocols may be the same or may be different. Different terminals that support a same steering protocol may have different target steering parameters or a same target steering parameter when accepting roaming steering. For the same target steering parameter, parameter values that are applicable to different terminals may be the same or may be different. Therefore, a parameter value of a target steering parameter is applicable to the terminal rather than the target steering parameter. For example, the Samsung Galaxy S9 supports the IEEE 802.11v steering protocol and requires that a steering parameter A (the target steering parameter) in the IEEE 802.11v steering protocol be a non-zero value. The Huawei P30 Pro also supports the IEEE 802.11v steering protocol, and requires that the steering parameter A in the IEEE 802.11v steering protocol be 0. For another example, in the IEEE 802.11v steering protocol, abridged in an abridged field is used to record a priority, and is a target steering parameter. For a terminal A, when the abridged is 1, a success rate of steering the terminal A to complete roaming is relatively high. In this case, the abridged parameter value 1 is a parameter value that is applicable to the terminal A. A terminal B does not parse the abridged field when accepting roaming steering. Therefore, the abridged cannot be used as a target steering parameter of the terminal B. For another example, a parameter in a disassociation imminent field in the IEEE 802.11v steering protocol is Disassociation Imminent, and a parameter in a disassociation timer field is Disassociation Timer. The two fields may be used as a combination, to indicate that the terminal performs roaming within a time specified by the Disassociation Timer. The Disassociation Imminent and the Disassociation Timer may be used as target steering parameters respectively. A terminal C requires that the terminal C can perform roaming within the time specified by the Disassociation Timer only when the Disassociation Imminent is 1 and the Disassociation Timer is a non-zero value. Therefore, 1 is a parameter value that is of the Disassociation Imminent and that is applicable to the terminal C, and the non-zero value is a parameter value that is of the Disassociation Timer and that is applicable to the terminal C. During roaming, a terminal D does not care about specific values of the Disassociation Imminent and the Disassociation Timer. Therefore, 0 may be used as a parameter value of each of the Disassociation Imminent and the Disassociation Timer and that is applicable to the terminal D. Certainly, the target steering parameter may not exist in some steering protocols. In this case, the control node does not need to determine the parameter value that is of the at least one target steering parameter in the steering protocol and that is applicable to the terminal. Whether the at least one target steering parameter exists in the steering protocol supported by the terminal, which target steering parameter exists, and a parameter value that is of each target steering parameter and that is applicable to the terminal are not specifically limited in this embodiment.

The parameter value that is of the at least one target steering parameter and that is applicable to the terminal is an optimal parameter value combination set by the terminal for the at least one target steering parameter during roaming. In a possible implementation, the skilled person may set a plurality of target parameter value sets for the at least one target steering parameter. Each target parameter value set includes a target parameter value of each of the at least one target steering parameter, and is equivalent to a group of parameter values of the at least one target steering parameter. The skilled person may steer, based on each target parameter value set, the terminal to perform roaming for a plurality of times, to obtain roaming results of the plurality of times of roaming. A roaming result of each time of roaming is used to indicate whether roaming performed by steering the terminal each time succeeds, to obtain, based on the roaming results of the plurality of times of roaming, a success rate of steering, based on each target parameter value set, the terminal to complete roaming. When the success rate of steering the terminal to complete roaming based on one target parameter value set of the at least one target steering parameter is greater than or equal to a target threshold, the control node may determine a target parameter value of each target steering parameter in the target parameter value set as a parameter value that is of each target steering parameter and that is applicable to the terminal.

After determining the parameter value that is of the at least one target steering parameter and that is applicable to the terminal, the control node may subsequently steer the terminal to roam from a first AP to a second AP based on the parameter value that is of the at least one target steering parameter and that is applicable to the terminal. For details, refer to a process shown in FIG. 6.

The signal measurement protocol supported by the terminal is used to measure a signal strength between the terminal and the AP. The signal strength between the terminal and the AP is used to indicate signal quality of a downlink signal received by the terminal from the AP, and the signal measurement protocol is a link signal quality measurement protocol supported by the terminal. Different terminals may support different signal measurement protocols. For example, a downlink signal measurement manner supported by the Huawei P30 Pro is a received channel power indicator (RCPI)—802.11k-radio link measurement, where 802.11k is a signal measurement protocol. A downlink signal measurement manner supported by the Huawei Mate 10 Pro is link margin—802.11h-transmit power control (TPC). The Huawei Mate 20 Pro supports a signal measurement protocol in the Huawei HiLink.

The network selection reference information is used to indicate network statuses that the first AP currently connected to the terminal and the second AP to be connected to the terminal need to meet when the terminal performs roaming. The network selection reference information may alternatively be considered as a roaming network condition built in the terminal. Subsequently, the control node may determine, based on the network selection information, whether the terminal can accept roaming steering, to increase the success rate of steering the terminal to perform roaming. Some terminals have requirements for only signal strengths during roaming, some terminals have requirements for only load statuses of the second AP during roaming, some terminals have requirements for only frequency bands and/or channel bandwidths of the second AP during roaming, and some terminals have requirements for signal strengths during roaming, have requirements for load statuses of the second AP, and have requirements for frequency bands and/or channel bandwidths of the second AP. Therefore, the network selection reference information may include at least one of signal strength reference information, load reference information, frequency band reference information, and bandwidth reference information.

The signal strength reference information is used to indicate a requirement of the terminal for a signal strength between the terminal and the first AP and a requirement of the terminal for a signal strength between the terminal and the second AP during terminal roaming. For the requirement for the signal strength, some terminals have requirements for only signal strengths between the terminals and the first AP, some terminals have requirements for only signal strengths between the terminals and the second AP, and some terminals have requirements not only for signal strengths between the terminals and the first AP and but also for signal strengths between the terminals and the second AP. Therefore, the signal strength reference information may include at least one of a source signal strength threshold, a target signal strength threshold, and a target signal strength difference. The target signal strength threshold is greater than or equal to the source signal strength threshold, the source signal strength threshold is a minimum signal strength that is required by terminal roaming and that is between the first AP and the terminal, and the target signal strength threshold is a minimum signal strength that is required by terminal roaming and that is between the second AP and the terminal. The target signal strength difference may be a difference between the target signal strength threshold and the source signal strength threshold.

The load reference information is used to indicate a requirement of the terminal for the load status of the second AP during terminal roaming. For the requirement for the load status of the second AP, some terminals have requirements for only channel utilization of the second AP during roaming, some terminals have requirements for only a quantity of terminals connected to the second AP, and some terminals have requirements not only for channel utilization of the second AP but also for a quantity of terminals connected to the second AP. Therefore, the load reference information may include at least one of target channel utilization, a target channel utilization difference, and a target quantity of associated terminals. The target channel utilization is highest channel utilization of the second AP during terminal roaming, the target channel utilization may be channel utilization measured by the second AP, or the target channel utilization may be channel utilization that is measured by the terminal and that is of the second AP. The target channel utilization difference may be a difference between the target channel utilization and channel utilization of the first AP. The target quantity of associated terminals is a maximum quantity of terminals connected to the second AP during terminal roaming.

The frequency band reference information is used to indicate a requirement of the terminal for a frequency band of the second AP during terminal roaming. For the requirement for the frequency band of the second AP, some terminals have requirements for only frequency bands of the second AP during roaming, and some terminals have requirements for only a frequency band range between a frequency band of the first AP and a frequency band of the second AP. Therefore, the frequency band reference information may include at least one of a target frequency band and a target frequency band range. The target frequency band is a minimum frequency band of the second AP during terminal roaming, and the target frequency band range is the frequency band range between the frequency band of the second AP and the frequency band of the first AP during terminal roaming.

The bandwidth reference information is used to indicate a requirement of the terminal for a channel bandwidth of the second AP during terminal roaming. For the requirement for the channel bandwidth of the second AP, some terminals have requirements for only channel bandwidths of the second AP during roaming, and some terminals have requirements for only a channel bandwidth range between a channel bandwidth of the first AP and a channel bandwidth of the second AP. Therefore, the bandwidth reference information may include at least one of a target channel bandwidth and a target channel bandwidth range. The target channel bandwidth is a minimum channel bandwidth of the second AP during terminal roaming, and the target channel bandwidth range is the channel bandwidth range between the channel bandwidth of the second AP and the channel bandwidth of the first AP during terminal roaming.

If the terminal roams, the terminal cannot receive a Wi-Fi signal in a time period (namely, a roaming period) in which the terminal is disconnected from the first AP and has not connected to the second AP. In this period, the terminal may suspend a service currently performed by the terminal. Some services are slightly affected by terminal roaming. For example, for a data download service, the terminal can temporarily suspend data download during roaming. After roaming is complete, the download continues without affecting content of downloaded data. However, some services are greatly affected by terminal roaming. For example, a video session may encounter a phenomenon such as frame freezing during roaming, which severely affects experience of a terminal user. Therefore, the control node may determine, based on service requirements of the terminal user for different services, which services are slightly affected by terminal roaming and which services are greatly affected by terminal roaming, and determine the services slightly affected by terminal roaming as target services. Because terminal roaming has relatively small impact on the target service, the terminal is allowed to roam when executing the target service. However, because terminal roaming has relatively large impact on a non-target service, the terminal may not be allowed to roam when executing the non-target service. Therefore, the network selection reference information may include a target service type, and the target service type may be a service type of the target service. The target service is a service slightly affected by terminal roaming. In a possible implementation, the target service may be a service that does not have a high requirement for real-time performance.

In a possible implementation, when network traffic required by a service of the terminal is less than or equal to a traffic threshold, the control node may determine that the service is a target service. When network traffic required by a service is greater than the traffic threshold, the control node may determine that the service is a non-target service. Therefore, the target service type in the network selection reference information may alternatively be replaced with the traffic threshold.

In a process of testing the steering protocol supported by the terminal, the skilled person may further obtain the parameter value that is of the at least one target steering parameter in the steering protocol supported by the terminal and that is applicable to the terminal, and the skilled person may further test the terminal, to obtain the signal measurement protocol supported by the terminal and the network selection reference information. After the skilled person determines at least one of the steering protocol supported by the terminal, the parameter value that is of the at least one target steering parameter in the steering protocol supported by the terminal and that is applicable to the terminal, the signal measurement protocol supported by the terminal, and the network selection reference information, at least of the identifier of the steering protocol supported by the terminal, the parameter value that is of the at least one target steering parameter in the steering protocol supported by the terminal and that is applicable to the terminal, the identifier of the signal measurement protocol supported by the terminal, and the network selection reference information may be uploaded on the roaming steering behavior feature generation interface of the control node. After the control node detects at least one of the identifier of the steering protocol supported by the terminal, the parameter value that is of the at least one target steering parameter in the steering protocol supported by the terminal and that is applicable to the terminal, the identifier of the signal measurement protocol supported by the terminal, and the network selection reference information that are uploaded on the interface by the skilled person, the control node may be triggered to obtain at least one of the identifier of the steering protocol supported by the terminal, the parameter value that is of the at least one target steering parameter in the steering protocol supported by the terminal and that is applicable to the terminal, the identifier of the signal measurement protocol supported by the terminal, and the network selection reference information that are uploaded by the skilled person. In this way, the control node may determine, based on content uploaded by the skilled person, at least one of the steering protocol supported by the terminal, the parameter value that is of the at least one target steering parameter in the steering protocol supported by the terminal and that is applicable to the terminal, the signal measurement protocol supported by the terminal, and the network selection reference information.

503: The control node generates a roaming steering behavior feature of the terminal based on at least one of the steering protocol, the parameter value that is of the at least one target steering parameter in the steering protocol and that is applicable to the terminal, the signal measurement protocol, and the network selection reference information, where the roaming steering behavior feature is used to indicate a behavior feature of the terminal during roaming.

The control node may combine the identifier of the steering protocol, the parameter value, the identifier of the signal measurement protocol, the network selection reference information, and an identifier of the terminal into the roaming steering behavior feature of the terminal, to indicate the behavior feature of the terminal during roaming. The identifier of the terminal may include at least one of a media access control (MAC) address of the terminal, a class identifier of the terminal, a model identifier of the terminal, a system version identifier of the terminal, and a vendor version identifier of the terminal. The class identifier of the terminal is used to indicate a type of the terminal. For example, the terminal is a smartphone or a notebook computer. The model identifier of the terminal is used to identify a model of the terminal. For example, the terminal is the Huawei P30 Pro or the Honor 10. The system version identifier of the terminal is used to indicate a version of a system used by the terminal, for example, the Android 10. The vendor version identifier of the terminal is used to indicate a vendor version of the terminal, for example, the emotion user interface (EUMI) 10.

It should be noted that for any terminal, the control node may obtain a roaming steering behavior feature of the terminal based on a process shown in steps 501 to 503. Therefore, the control node may obtain roaming steering behavior features of a plurality of terminals. Each time when the control node obtains a roaming steering behavior feature of one terminal, the control node may further store the obtained roaming steering behavior feature of the terminal, so that the control node can subsequently determine, based on the roaming steering behavior feature of the terminal, a roaming occasion for steering the terminal to perform roaming. In a possible implementation, the control node may further deliver the roaming steering behavior features of the plurality of terminals to each AP in a terminal roaming steering system, so that each AP may also determine, based on a roaming steering behavior feature of a terminal connected to the AP, a roaming occasion for steering the terminal connected to the AP to perform roaming, to steer the terminal connected to the AP to perform roaming at a proper roaming occasion.

The process shown in steps 501 to 503 is a process in which the control node obtains the roaming steering behavior feature of the terminal in an offline manner. In a possible implementation, the control node may further learn a roaming steering behavior feature of each terminal online based on an artificial intelligence (AI) model.

Figure 6:
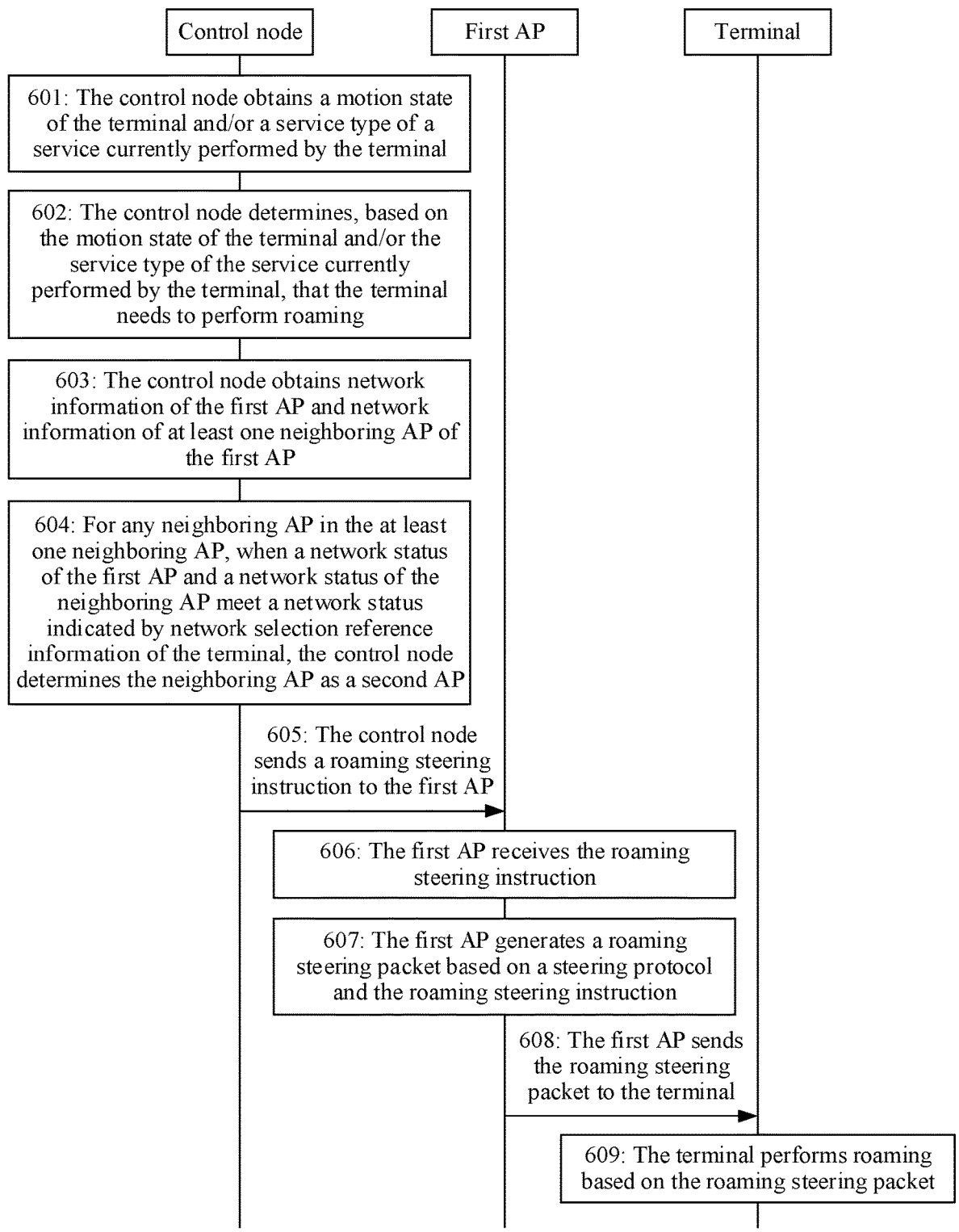
FIG. 6 is a flowchart of a terminal roaming steering method according to an embodiment.

To further describe a process in which the control node steers, based on the roaming steering behavior feature of the terminal, the terminal to perform roaming, refer to a flowchart of a terminal roaming steering method according to an embodiment shown in FIG. 6.

601: A control node obtains a motion state of a terminal and/or a service type of a service currently performed by the terminal.

The terminal is any terminal, and the control node may determine the motion state of the terminal based on a movement speed and a movement direction that are reported by the terminal. The motion state of the terminal may include the movement speed and the movement direction. The movement speed and the movement direction of the terminal may be used to indicate whether the terminal is static or moving. If the movement speed is 0, the terminal is static. If the movement speed is not 0, it indicates that the terminal is moving. If the movement speed is not 0 and the movement direction of the terminal points to a first AP connected to the terminal, it indicates that the terminal is approaching the first AP. If the movement speed is not 0 and the movement direction of the terminal is opposite to a direction in which the first AP is located, it indicates that the terminal is moving away from the first AP. Certainly, the control node may further predict, based on the movement speed and the movement direction of the terminal, a movement route of the terminal and each AP passing through the movement route.

In a target time period, the control node may further receive signal strengths that are between the first AP and the terminal and that are reported by the first AP for a plurality of times, and the control node determines the motion state of the terminal based on a change trend of the signal strengths that are between the first AP and the terminal and that are reported for the plurality of times. The motion state of the terminal may include the change trend of the signal strengths that are between the first AP and the terminal and that are reported for the plurality of times. If the signal strengths that are between the first AP and the terminal and that are reported for the plurality of times are increasingly large, it indicates that the terminal is approaching the first AP. If the signal strengths that are between the first AP and the terminal and that are reported for the plurality of times is increasingly small, it indicates that the terminal is moving away from the first AP. If a difference between the signal strengths that are between the first AP and the terminal and that are reported for the plurality of times is less than or equal to a target threshold, it may be considered that the terminal is static. The target threshold is not specifically limited in this embodiment.

It should be noted that, before performing step 601, the control node may further deliver a roaming steering behavior feature of each terminal to each AP in a terminal roaming steering system, so that each AP may determine, based on the roaming steering behavior feature of each terminal, a signal measurement protocol supported by each terminal. Alternatively, the control node may deliver only an identifier of a signal measurement protocol supported by each terminal to each AP, so that each AP can periodically measure a signal strength between each AP and a connected terminal based on a signal measurement protocol supported by the connected terminal, and reports a signal strength between each AP and the connected terminal to the control node. In this way, the control node can obtain, in the target time period, the signal strength of the terminal connected to each AP.

The control node may further detect a service packet in the service currently performed by the terminal, to determine whether the service type of the service is a target service type. The control node may alternatively determine the service type of the terminal based on network traffic consumed by the service. A process in which the control node determines the service type of the terminal based on the network traffic consumed by the service is described in step 502. Details are not described again in this embodiment.

602: The control node determines, based on the motion state of the terminal and/or the service type of the service currently performed by the terminal, that the terminal needs to perform roaming.

In a process in which the terminal is moving away from the first AP, the signal strength between the first AP and the terminal is weakened. To avoid bringing poor experience to a terminal user, the terminal needs to perform roaming in this case. If the terminal is performing a real-time service, terminal roaming may affect the real-time service performed by the terminal. In this case, the terminal does not need to perform roaming temporarily. In a possible implementation, when the motion state of the terminal indicates that the terminal is moving away from the first AP, and/or the service type of the service currently performed by the terminal is the target service type, the control node determines that the terminal needs to perform roaming. Otherwise, it is determined that the terminal does not need to perform roaming. For example, as long as the motion state of the terminal indicates that the terminal is moving away from the first AP, the control node determines that the terminal needs to perform roaming. For another example, as long as the service type of the service currently performed by the terminal is the target service type, the control node determines that the terminal needs to perform roaming. For still another example, the control node determines that the terminal needs to perform roaming only when the motion state of the terminal indicates that the terminal is moving away from the first AP, and the service type of the service currently performed by the terminal is the target service type.

When the terminal needs to perform roaming, the control node may steer the terminal to perform roaming by using a process shown in the following steps 603 to 609. When the terminal does not need to perform roaming, the control node may not steer the terminal to perform roaming temporarily.

603: The control node obtains network information of the first AP and network information of at least one neighboring AP of the first AP, where network information of one AP is used to indicate a network status of the AP.

Network information of one AP may include at least one of a signal strength between the AP and the terminal, channel utilization of the AP, a frequency band of the AP, a quantity of terminals associated with the AP, and a channel bandwidth of the AP. For any AP in the first AP and a second AP, content included in network information of the any AP may correspond to content of network selection reference information of the terminal. If the network selection reference information of the terminal includes only signal strength reference information, the network information of the any AP may include only a signal strength between the any AP and the terminal. If the network selection reference information of the terminal includes signal strength reference information and frequency band reference information, the network information of the any AP includes at least a signal strength between the any AP and the terminal and a frequency band of the any AP.

The control node may deliver an instruction to each of the first AP and the at least one neighboring AP, to trigger the first AP and the at least one neighboring AP to report the respective network information. In a possible implementation, step 603 may be implemented by using a process shown in the following steps 6031 to 6036.

Step 6031: The control node sends an information obtaining request to each of the first AP and the at least one neighboring AP, where the information obtaining request is used to indicate the AP to return the network information to the control node.

The information obtaining request may include address information of the terminal and an identifier of a signal measurement protocol supported by the terminal. The signal measurement protocol is used to measure a signal strength between the AP and the terminal. The information obtaining request may further include a target quantity of measurement times, and the target quantity of measurement times is a quantity of times that measurement needs to be performed. The information obtaining request may further include a basic service set identifier (BSSID) of the first AP and an identifier of a channel of the first AP. In a possible implementation, because the first AP knows the BSSID and the channel of the first AP, the information obtaining request sent by the control node to the first AP may not include the BSSID of the first AP and the identifier of the channel of the first AP, to reduce a data volume of the information obtaining request. However, because the neighboring AP does not know the BSSID of the first AP and the channel of the first AP, the information obtaining request sent by the control node to the at least one neighboring AP may further include the BSSID of the first AP and the identifier of the channel of the first AP, so that the neighboring AP may disguise, based on the BSSID of the first AP and the identifier of the channel of the first AP, as the first AP to measure a signal strength between the neighboring AP and the terminal. For details, refer to a process in which the neighboring AP measures the signal strength between the neighboring AP and the terminal in the following step 6035.

The control node may determine the at least one neighboring AP of the first AP based on location information of the first AP, where the location information of the first AP is used to indicate a location of the first AP. A distance between the at least one neighboring AP and the first AP is less than or equal to a preset distance. Alternatively, the control node may use at least one AP passing through a predicted movement path of the terminal as the at least one neighboring AP of the first AP.

Step 6032: The first AP receives the information obtaining request.

Step 6033: The first AP sends the network information of the first AP to the control node based on the information obtaining request.

After receiving the information obtaining request, the first AP may determine a to-be-measured terminal based on the address information of the terminal in the received information obtaining request, and determine, based on the identifier of the signal measurement protocol supported by the terminal in the received information obtaining request, a signal measurement protocol supported by the to-be-measured terminal. The first AP may further measure the signal strength between the first AP and the terminal based on the address information of the terminal and the protocol supported by the terminal, and return the network information of the first AP to the control node based on a measurement result. In a possible implementation, step 6033 may be implemented by using a process shown in the following steps A to C.

Step A: The first AP measures the signal strength between the terminal and the first AP based on the address information of the terminal and the signal measurement protocol supported by the terminal.

The first AP may send a signal strength measurement packet to the terminal through the channel of the first AP based on the address information of the terminal and the signal measurement protocol supported by the terminal. The signal strength measurement packet may include the BSSID of the first AP. After the terminal receives the signal strength measurement packet, the terminal may determine, based on the BSSID of the first AP, that the first AP measures the signal strength. In this case, the terminal may return a signal measurement response packet to the first AP. The first AP may determine the signal strength between the terminal and the first AP based on a sending time of the signal strength measurement packet and a receiving time of the signal measurement response packet.

It should be noted that, for different signal measurement protocols, processes in which the first AP measures the signal strength are different. For example, if the signal measurement protocol supported by the terminal is the 802.11k-radio-link-measurement, the first AP may obtain, by using 802.11k-radio-link-measurement, a signal strength (namely, the signal strength between the first AP and the terminal) of a downlink signal received by the terminal. If the signal measurement protocol supported by the terminal is the link margin—802.11h-TPC, the first AP measures the signal strength of the terminal by using the link margin—802.11h-TPC, to obtain a link margin of a downlink signal received by the terminal, and determines a signal strength of the downlink signal based on the link margin of the downlink signal. If the terminal supports the Huawei HiLink, the first AP may measure the signal strength of the terminal by using a signal measurement protocol in the Huawei HiLink, to obtain a signal strength of an uplink signal sent by the terminal and a signal strength of a downlink signal received by the terminal.

Step B: The first AP generates the network information of the first AP based on the measured signal strength between the terminal and the first AP.

After the terminal determines the signal strength between the terminal and the first AP, the first AP may determine at least one of the signal strength between the terminal and the first AP, channel utilization of the first AP, a frequency band of the first AP, a quantity of terminals associated with the first AP, and a channel bandwidth of the first AP, to form the network information of the first AP.

Step C: The first AP sends the network information of the first AP to the control node.

Step 6034: The at least one neighboring AP receives the information obtaining request sent by the control node.

Step 6035: The at least one neighboring AP sends the network information of the at least one neighboring AP to the control node based on the information obtaining request.

For any neighboring AP in the at least one neighboring AP, the neighboring AP may determine, based on the received information obtaining request, a to-be-measured terminal, a signal measurement protocol supported by the terminal, the BSSID of the first AP, and the channel of the first AP. The neighboring AP may generate a signal strength measurement packet based on the signal measurement protocol supported by the terminal and the BSSID of the first AP, switch to the channel of the first AP, and send the signal strength measurement packet to the terminal on the channel of the first AP based on the address information of the terminal. In this way, the neighboring AP may disguise as the first AP to measure a signal strength between the neighboring AP and the terminal until the signal strength between the neighboring AP and the terminal is determined. The neighboring AP may send network information of the neighboring AP to the control node based on the signal strength between the neighboring AP and the terminal. A process in which the neighboring AP sends the network information of the neighboring AP to the control node based on the signal strength between the neighboring AP and the terminal is similar to a process in which the first AP sends the network information of the first AP to the control node based on the signal strength between the first AP and the terminal. The process in which the neighboring AP sends the network information of the neighboring AP to the control node based on the signal strength between the neighboring AP and the terminal is not described in this embodiment.

It should be noted that for any AP in the first AP and the at least one neighboring AP, when the information obtaining request carries the target quantity of measurement times, the any AP may further measure a target quantity of measurement times for a signal strength between the any AP and the terminal, and returns network information of the any AP to the control node once based on each measurement result.

Step 6036: The control node receives the respective network information sent by the first AP and the at least one neighboring AP based on the information obtaining request.

In a possible implementation, the control node may alternatively obtain the network information of the first AP and the network information of the at least one neighboring AP without delivering the instruction to each of the first AP and the at least one neighboring AP. In a possible implementation, each AP in the roaming steering system stores a BSSID and a channel identifier of at least one neighboring AP of the AP. Each time when the first AP is connected to a terminal, the first AP may measure a signal strength between the first AP and the terminal in each measurement cycle, and return network information to the control node once based on each measurement result. In addition, the first AP may further send address information of a newly connected terminal and an identifier of a signal measurement protocol supported by the newly connected terminal to the at least one neighboring AP of the first AP, so that each neighboring AP can measure, in a respective measurement cycle, a signal strength between the neighboring AP and the newly connected terminal based on the address information of the terminal newly connected to the first AP, the signal measurement protocol supported by the newly connected terminal, and a BSSID and a channel of the any AP, and returns network information to the control node once based on each measurement result. In this way, the control node can obtain the network information of the first AP and the network information of the at least one neighboring AP.

When the control node receives network information sent by a same AP for a plurality of times, the control node may further calculate an average value of content in the network information sent by the AP for the plurality of times, to obtain average network information of the AP and use the average network information of the AP as network information of the AP.

604: For any neighboring AP in the at least one neighboring AP, when a network status of the first AP and a network status of the neighboring AP meet a network status indicated by the network selection reference information of the terminal, the control node determines the neighboring AP as the second AP.

When the network status of the first AP and the network status of the neighboring AP meet the network status indicated by the network selection reference information of the terminal, it indicates that the neighboring AP and the first AP meet a roaming condition built in the terminal. In this case, the control node may use the neighboring AP as the second AP (namely, a target AP of the terminal) to be connected to the terminal, to subsequently steer the terminal to roam from the first AP to the second AP.

When the network status of the first AP and the network status of the neighboring AP meet at least one of the following, the network status of the first AP and the network status of the neighboring AP meet the network status indicated by the network selection reference information:

Item 1: The signal strength between the first AP and the terminal is less than or equal to a source signal strength threshold, and/or the signal strength between the neighboring AP and the terminal is greater than or equal to a target signal strength threshold.

For example, when the signal strength reference information includes only the source signal strength threshold, if the signal strength between the first AP and the terminal is less than or equal to the source signal strength threshold, the signal strength between the first AP and the terminal meets a signal strength indicated by the signal strength reference information. For another example, when the signal strength reference information includes only the source signal strength threshold and the target signal strength threshold, if the signal strength between the first AP and the terminal is less than or equal to the source signal strength threshold, and the signal strength between the neighboring AP and the terminal is greater than the target signal strength threshold, the signal strength between the first AP and the terminal meets a signal strength indicated by the signal strength reference information, and the signal strength between the neighboring AP and the terminal also meets the signal strength indicated by the signal strength reference information.

Because the target signal strength threshold may be greater than the source signal strength threshold, if the terminal roams from the first AP to the neighboring AP, a signal strength of a Wi-Fi signal provided by the neighboring AP for the terminal may be higher, to improve experience of the terminal user.

Item 2: The signal strength between the first AP and the terminal is less than or equal to a source signal strength threshold, and a difference between the signal strength between the neighboring AP and the terminal and the signal strength between the first AP and the terminal is greater than or equal to a target signal strength difference.

For example, when the signal strength reference information includes only the source signal strength threshold and the target signal strength difference, if the signal strength between the first AP and the terminal is less than or equal to the source signal strength threshold, and the difference between the signal strength between the neighboring AP and the terminal and the signal strength between the first AP and the terminal is greater than or equal to the target signal strength difference, the signal strength between the first AP and the terminal meets a signal strength indicated by the signal strength reference information, and the signal strength between the neighboring AP and the terminal also meets the signal strength indicated by the signal strength reference information.

In a possible implementation, when the signal strength reference information includes the source signal strength threshold, a target signal strength threshold, and the target signal strength difference, if the signal strength between the first AP and the terminal is less than or equal to the source signal strength threshold, the signal strength between the neighboring AP and the terminal is greater than or equal to the target signal strength threshold, and the difference between the signal strength between the first AP and the terminal and the signal strength between the neighboring AP and the terminal is greater than or equal to the target signal strength difference, the signal strength between the first AP and the terminal meets the signal strength indicated by the signal strength reference information, and the signal strength between the neighboring AP and the terminal also meets the signal strength indicated by the signal strength reference information.

Item 3: Channel utilization of the neighboring AP is less than or equal to target channel utilization.

For example, load reference information includes only target channel utilization 50%. If the channel utilization of the neighboring AP is less than or equal to 50%, a load status of the neighboring AP meets a load status indicated by the load reference information. When the target channel utilization is relatively low, and the channel utilization of the neighboring AP is lower than the target channel utilization, if the terminal roams from the first AP to the neighboring AP, the neighboring AP may provide more channel resources for the terminal, to increase service data transmission efficiency of the terminal, so as to improve experience of the terminal user.

Item 4: the signal strength between the neighboring AP and the terminal is greater than or equal to the signal strength between the first AP and the terminal, and a difference between the channel utilization of the neighboring AP and the channel utilization of the first AP is greater than or equal to a target channel utilization difference.

For example, when load reference information includes only target channel utilization, and the network selection reference information includes the signal strength reference information, if the signal strength between the neighboring AP and the terminal is greater than or equal to the signal strength between the first AP and the terminal, and the difference between the channel utilization of the neighboring AP and the channel utilization of the first AP is greater than or equal to the target channel utilization difference, a load status of the neighboring AP meets a load status indicated by the load reference information.

Item 5: A quantity of terminals connected to the neighboring AP is less than or equal to a target quantity of associated terminals.

The target quantity of associated terminals is a maximum quantity of terminals that can be associated with the second AP and that is required by the terminal. Therefore, the target quantity of associated terminals may be a threshold of a quantity of terminals associated with the second AP. For example, when load reference information includes only the target quantity of associated terminals, if the quantity of terminals connected to the neighboring AP is less than or equal to the target quantity of associated terminals, a load status of the neighboring AP meets a load status indicated by the load reference information. When the target quantity of associated terminals is relatively small, and the quantity of terminals connected to the neighboring AP is less than or equal to the target quantity of associated terminals, if the terminal roams from the first AP to the neighboring AP, the neighboring AP may provide more network resources for the terminal, to increase service data transmission efficiency of the terminal, so as to improve experience of the terminal user.

Item 6: The frequency band of the first AP is less than or equal to a target frequency band, and a frequency band of the neighboring AP is greater than the target frequency band.

When the frequency band reference information includes only the target frequency band, if the frequency band of the first AP is less than or equal to the target frequency band, and the frequency band of the neighboring AP is greater than the target frequency band, both the frequency band of the neighboring AP and the frequency band of the first AP meet a frequency band indicated by the frequency band reference information. If the terminal roams from the first AP to the neighboring AP, the neighboring AP may provide a wider range of frequency band resources for the terminal, so that the terminal can perform more services in a target frequency band range, to improve experience of the terminal user.

Item 7: The signal strength between the neighboring AP and the terminal is greater than or equal to the signal strength between the first AP and the terminal, and a frequency band range between a frequency band of the neighboring AP and the frequency band of the first AP is greater than or equal to a target frequency band range.

For example, when the frequency band reference information includes only the target frequency band range, and the network selection reference information includes the signal strength reference information, if the signal strength between the neighboring AP and the terminal is greater than or equal to the signal strength between the first AP and the terminal, and the frequency band range between the frequency band of the neighboring AP and the frequency band of the first AP is greater than or equal to the target frequency band range, it may also be considered that the frequency band of the neighboring AP meets a frequency band indicated by the frequency band reference information.

Item 8: The channel bandwidth of the first AP is less than or equal to a target channel bandwidth, and a channel bandwidth of the neighboring AP is greater than the target channel bandwidth.

When the bandwidth reference information includes only the target channel bandwidth, if the channel bandwidth of the first AP is less than or equal to the target channel bandwidth, and the channel bandwidth of the neighboring AP is greater than the target channel bandwidth, both the channel bandwidth of the neighboring AP and the channel bandwidth of the first AP meet a channel bandwidth indicated by the frequency band reference information. If the terminal roams from the first AP to the neighboring AP, the neighboring AP may provide more channel bandwidth resources for the terminal, to increase service data transmission efficiency of the terminal, so as to improve experience of the terminal user.

Item 9: The signal strength between the neighboring AP and the terminal is greater than or equal to the signal strength between the first AP and the terminal, and a channel bandwidth range between a channel bandwidth of the neighboring AP and the channel bandwidth of the first AP is greater than or equal to a target channel bandwidth range.

For example, when bandwidth reference information includes only the target channel bandwidth range, and the network selection reference information includes the signal strength reference information, if the signal strength between the neighboring AP and the terminal is greater than or equal to the signal strength between the first AP and the terminal, and the channel bandwidth range between the channel bandwidth of the neighboring AP and the channel bandwidth of the first AP is greater than or equal to the target channel bandwidth range, it may also be considered that the channel bandwidth of the neighboring AP meets a channel bandwidth indicated by the bandwidth reference information.

The network selection reference information may include at least one of the signal strength reference information, the load reference information, the frequency band reference information, and the bandwidth reference information. Each of the signal strength reference information, the load reference information, the frequency band reference information, and the bandwidth reference information may include a plurality of parameters. However, the control node can determine the neighboring AP as the second AP only when the network status of the first AP and the network status of the neighboring AP meet all network statuses indicated by the network selection reference information of the terminal. Only the foregoing nine determining manners are listed in this embodiment, and there may be another determining manner based on content included in the network selection reference information. The another determining manner is not described in this embodiment.

It should be noted that, if only one neighboring AP in the at least one neighboring AP meets a requirement of the network selection reference information, the control node may use the neighboring AP as the second AP of the terminal. If a plurality of neighboring APs all meet a requirement of the network selection reference information, the control node may further select, from the plurality of neighboring APs, a neighboring AP with a best network status as the second AP of the terminal. If a plurality of neighboring APs all meet a requirement of the network selection reference information, the control node may alternatively directly use the plurality of neighboring APs as a plurality of candidate second APs of the terminal, and the terminal selects one candidate second AP from the plurality of candidate second APs as the second AP of the terminal. In addition, a process shown in step 604 is a process in which the control node determines the second AP from the at least one neighboring AP of the first AP.

605: The control node sends a roaming steering instruction to the first AP, where the roaming steering instruction is used to instruct the first AP to steer, based on a steering protocol, the terminal to roam from the first AP to the second AP.

The roaming steering instruction may include an identifier of the second AP, an identifier of the steering protocol, and the address information of the terminal. The roaming steering instruction may further include at least one of a parameter value that is of the at least one target steering parameter in the steering protocol and that is applicable to the terminal and network information of the second AP.

It should be noted that, if the control node determines the plurality of candidate second APs only from the neighboring APs of the first AP, but does not determine the second AP, the roaming steering instruction may further include network information of the plurality of candidate second APs and identifiers of the plurality of candidate second APs.

A process shown in step 605 is a process in which the control node steers, based on the steering protocol, the terminal to roam from the first AP to the second AP. When the roaming steering instruction includes the parameter value that is of the at least one target steering parameter and that is applicable to the terminal, the process shown in step 605 is a process in which the control node steers, based on the parameter value that is of the at least one target steering parameter in the steering protocol and that is applicable to the terminal, the terminal to roam from the first AP to the second AP.

606: The first AP receives the roaming steering instruction.

607: The first AP generates a roaming steering packet based on the steering protocol and the roaming steering instruction, where the roaming steering packet is used to indicate that the terminal roams from the first AP to the second AP.

The first AP may determine a to-be-steered terminal based on the address information that is of the terminal and that is carried in the roaming steering instruction, determine, based on the identifier that is of the steering protocol and that is carried in the roaming steering instruction, a steering protocol supported by the to-be-steered terminal, and encapsulate, based on the steering protocol supported by the terminal, the roaming steering instruction into the roaming steering packet. That is, the roaming steering packet may include content carried in the roaming steering instruction. When the roaming steering packet includes the parameter value that is of the at least one target steering parameter and that is applicable to the terminal, a process shown in step 607 is a process in which the first AP steers, based on the parameter value that is of the at least one target steering parameter in the steering protocol and that is applicable to the terminal, the terminal to roam from the first AP to the second AP.

608: The first AP sends the roaming steering packet to the terminal.

The first AP may send the roaming steering packet to the terminal based on the address information of the terminal.

609: The terminal performs roaming based on the roaming steering packet.

When the roaming steering packet does not carry the parameter value that is of the at least one target steering parameter and that is applicable to the terminal, it indicates that the target steering parameter does not need to be considered when the terminal roams. In this case, the terminal may determine, based on the identifier that is of the second AP and that is carried in the roaming steering packet, the second AP to be connected to the terminal, and the terminal may disconnect a wireless connection to the first AP, and be connected to the second AP to complete roaming.

If the roaming steering packet carries the parameter value that is of the at least one target steering parameter and that is applicable to the terminal and the network information of the second AP, the terminal determines whether the parameter value that is of the at least one target steering parameter and that is applicable to the terminal is a preset parameter value, and determines whether a network status indicated by the network information of the second AP meets the network status indicated by the network selection reference information. If the parameter value that is of the at least one target steering parameter and that is applicable to the terminal is the preset parameter value, and the network status indicated by the network information of the second AP meets the network status indicated by the network selection reference information, the terminal may determine, based on the identifier that is of the second AP and that is carried in the roaming steering packet, the second AP to be connected to the terminal, and the terminal may disconnect the wireless connection to the first AP, and be connected to the second AP to complete roaming. A process in which the terminal determines whether the network status indicated by the network information of the second AP meets the network status indicated by the network selection reference information is similar to a process in which the control node determines whether the network status indicated by the network information of the second AP meets the network status indicated by the network selection reference information in step 604. The process in which the terminal determines whether the network status indicated by the network information of the second AP meets the network status indicated by the network selection reference information is not described in this embodiment.

If the roaming steering packet neither carries the network information of the second AP nor carries the identifier of the second AP, but carries the network information of the plurality of candidate second APs and the identifiers of the plurality of candidate second APs, the terminal may select, based on the network information of the plurality of candidate second APs and the network selection reference information, a candidate second AP with a best network status as the second AP of the terminal, and the terminal may disconnect the wireless connection to the first AP, and be connected to the second AP to complete roaming.

It should be noted that, because a roaming steering behavior feature of the terminal includes a limitation on the motion state of the terminal and/or the service type of the service when the terminal supports steering, in the foregoing step 602, a process in which the control node determines, based on the motion state of the terminal and/or the service type of the service currently performed by the terminal, whether the terminal needs to perform roaming is a process in which the control node determines, based on the roaming steering behavior feature of the terminal, a roaming occasion for steering the terminal to perform roaming. In addition, when the network status of the first AP and a network status of the second AP meet the network status indicated by the network selection reference information of the terminal, it indicates that in this case, if the control node steers the terminal to roam from the first AP to the second AP, the control node sends the roaming steering instruction to the first AP only when a success rate of steering roaming is very high. Therefore, a process shown in step 605 may also be the process in which the control node determines, based on the roaming steering behavior feature of the terminal, the roaming occasion for steering the terminal to perform roaming.

To further describe a process shown in steps 601 to 609, refer to the following examples 1 to 3.

Example 1: A mobile phone (a terminal A) supports the IEEE 802.11v protocol and requires that a target signal strength be greater than −70 decibels (dB). At a moment, a signal strength of a downlink signal of the terminal A on an AP 0 (the first AP) is −70 dB (namely, a signal strength between the first AP and the terminal A), and a signal strength of a downlink signal of the terminal A on a neighboring AP 1 is −60 dB. In this case, the control node determines whether the IEEE 802.11v protocol is a steering protocol supported by the terminal A. If the IEEE 802.11v protocol is the steering protocol supported by the terminal A, the control node sends a roaming steering instruction to the terminal A. After receiving the roaming steering instruction, the terminal A evaluates whether a signal strength of the neighboring AP 1 meets a target signal strength required by network selection reference information of the terminal A. If the signal strength of the neighboring AP 1 meets the target signal strength required by the network selection reference information of the terminal A, the terminal A roams to the neighboring AP 1.

Example 2: A laptop (a terminal B) supports the IEEE 802.11v protocol, and requires that target channel utilization cannot exceed 50%. At a moment, the terminal B is connected to an AP 0. A signal strength between the AP 0 and the terminal B is −65 dB. There is a neighboring AP 1, and a signal strength between the AP 1 and the terminal B is −55 dB. However, the AP 1 is connected to another terminal and there is traffic on the AP 1. In this case, channel utilization of the AP 1 reaches 70%. The control node determines that if in this network status of the AP 1, the AP 0 delivers a roaming steering packet to the terminal B, to steer the terminal B to the AP 1 by using the IEEE 802.11v protocol. In this case, a requirement of network selection reference information of the terminal B cannot be met, and the terminal B rejects or does not accept the roaming steering packet. Therefore, the control node does not deliver the roaming steering instruction to the AP 1, but waits for a next network status of the neighboring AP 1. For example, if a terminal connected to the neighboring AP 1 leaves, and the channel utilization of the neighboring AP 1 decreases to 20%, the control node delivers the roaming steering instruction to the AP 1.

Example 3: A mobile phone (a terminal C) supports the Huawei HiLink, trusts roaming steering of the control node, and does not have network selection reference information. Therefore, provided that the control node determines that a signal strength between the terminal and the first AP is less than a signal strength between the terminal and the second AP, the control node may immediately initiate steering to the terminal C based on a steering protocol in the Huawei HiLink.

According to the method provided in this embodiment, the steering protocol supported by the terminal and the second AP are determined, and the terminal is steered, based on the steering protocol supported by the terminal, to roam from the first AP to the second AP, to increase a success rate of terminal roaming. In addition, whether the terminal needs to perform roaming is determined based on the motion state of the terminal and/or the service type of the service currently performed by the terminal. The terminal is steered to perform roaming only when the terminal needs to perform roaming, to avoid impact of terminal roaming on a service performed by the terminal, so as to improve experience of the terminal user. In addition, the second AP is determined based on the network status of the first AP, the network status of the at least one neighboring AP, and the network selection reference information of the terminal, to prevent the determined second AP from not meeting the requirement of the network selection reference information, so as to further increase the success rate of terminal roaming.

Figure 7:
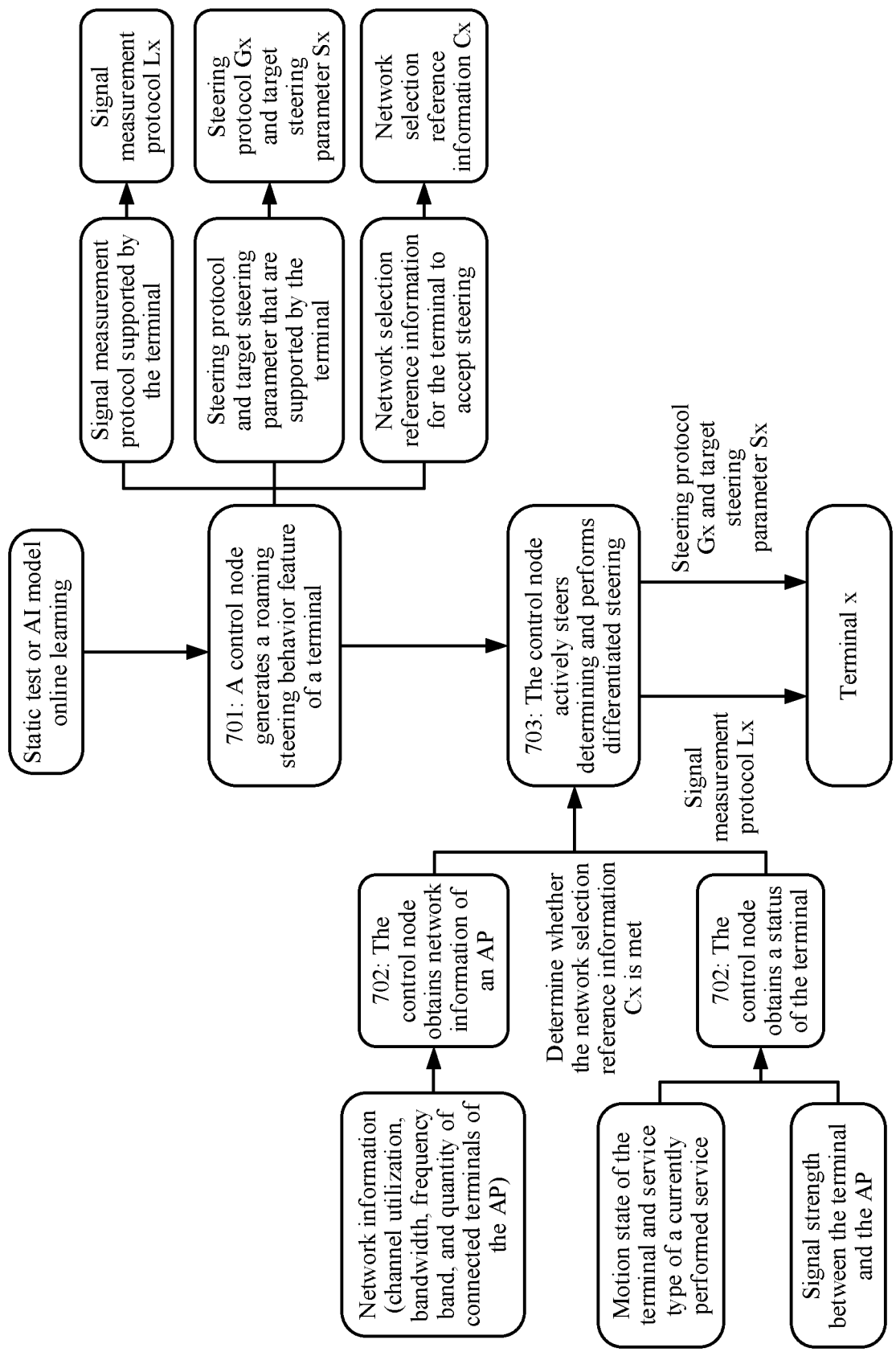
FIG. 7 is a flowchart of a terminal roaming steering method according to an embodiment.

The control node may first generate the roaming steering behavior feature of the terminal, and then steer the terminal to perform roaming based on the roaming steering behavior feature of the terminal, the network information of the first AP, and the network information of the at least one neighboring AP. To further describe this process, refer to FIG. 7. FIG. 7 is a flowchart of a terminal roaming steering method according to an embodiment.

701: A control node generates a roaming steering behavior feature of a terminal.

The control node may generate the roaming steering behavior feature of the terminal based on a static test or AI model online learning. For a specific process, refer to FIG. 5. The roaming steering behavior feature of the terminal may include a signal measurement protocol (for example, a signal measurement protocol Lx) supported by the terminal, a steering protocol supported by the terminal and a parameter value that is of at least one target steering parameter in the steering protocol (for example, a steering protocol Gx and a target steering parameter Sx) and that is applicable to the terminal, and network selection reference information (for example, network selection reference information Cx) for the terminal to accept steering.

702: The control node obtains network information of a first AP, network information of at least one neighboring AP, and a status of the terminal.

Network information of one AP may include channel utilization, a channel bandwidth, a frequency band, and a quantity of connected terminals of the AP. The status of the terminal may include a motion state of the terminal, a service type of a currently performed service, and a signal strength between the terminal and the AP.

703: The control node performs determining on steering of the terminal based on the network information of the first AP, the network information of the at least one neighboring AP, the status of the terminal, and the roaming steering behavior feature of the terminal. If a determining result is to steer the terminal, the control node may perform differentiated steering on different terminals based on roaming steering behavior features of the different terminals.

A process in which the control node performs determining on steering of the terminal based on the network information of the first AP, the network information of the at least one neighboring AP, the status of the terminal, and the roaming steering behavior feature of the terminal may include two determining processes. One determining process is determining, based on the status of the terminal, whether the terminal needs to perform roaming. For details, refer to step 602. The other determining process is determining whether the second AP can be selected based on the network information of the first AP, the network information of the at least one neighboring AP, and the roaming steering behavior feature of the terminal. For details, refer to step 604. Different terminals support different steering protocols. Therefore, formats of roaming steering packets sent to the different terminals may be different, and content carried in the roaming steering packets sent to the different terminals may also be different. In this way, differentiated steering is performed on the different terminals. A terminal x is used as an example. The control node may deliver, to the terminal x by using an AP connected to the terminal x, the signal measurement protocol Lx and the steering protocol Gx that are supported by the terminal x, and the target steering parameter Sx. It should be noted that, in FIG. 7, step 703 is abbreviated as "the control node actively steers determining and differentiated steering".

Figure 8:
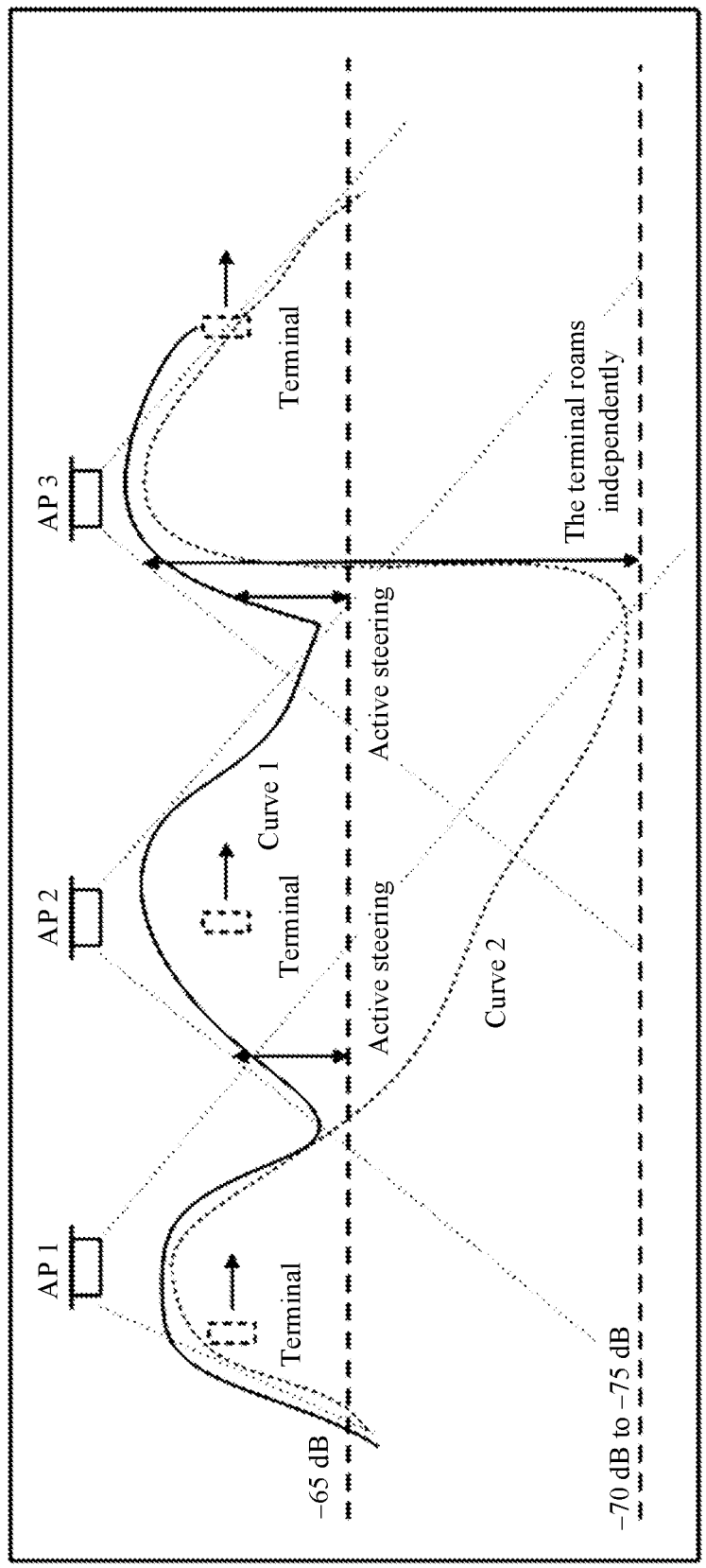
FIG. 8 is a schematic diagram of comparison between changes in a signal strength on a terminal side in a terminal roaming process according to an embodiment.

In processes that are shown in FIG. 6 and FIG. 7 and in which the control node steers the terminal to perform roaming, the signal strength of the Wi-Fi signal received by the terminal in a roaming process can be kept within a relatively high signal strength range. For example, FIG. 8 is a schematic diagram of comparison between changes in a signal strength on a terminal side in a terminal roaming process according to an embodiment. In FIG. 8, a curve 1 shows a signal strength obtained when a terminal performs roaming under steering of a control node in a moving process, and a curve 2 shows a signal strength obtained when the terminal roams independently in the moving process. It can be seen from the curve 1 that when the terminal moves in a core coverage area of an AP 1, a signal strength on the terminal side is higher than −65 dB. When the terminal moves from the core coverage area of the AP 1 to a core coverage area of an AP 2, a signal strength between the terminal and the AP 1 is lower than −65 dB while a signal strength between the terminal and the AP 2 is higher than −65 dB. The terminal accepts active steering of the control node and roams from the AP 1 to the AP 2. In this case, the signal strength on the terminal side is still higher than −65 dB. When the terminal moves from the core coverage area of the AP 2 to a core coverage area of an AP 3, the signal strength between the terminal and the AP 1 ranges from −75 dB to −70 dB, the signal strength between the terminal and the AP 2 ranges from −70 dB to −65 dB, and a signal strength between the terminal and the AP 3 is higher than −65 dB. The terminal accepts active steering of the control node and roams from the AP 2 to the AP 3. In this case, the signal strength on the terminal side is still higher than −65 dB. It can be learned that, in the moving process, if the terminal performs roaming based on the active steering of the control node, the signal strength on the terminal side can be kept within a relatively high signal strength range, to increase service data transmission efficiency of the terminal. It can be seen from the curve 2 that the terminal moves starting from the core coverage area of the AP 1, roams independently, and roams from the AP 1 to the AP 3 only when moving to the core coverage area of the AP 3. However, the terminal is always connected to the AP 1. Therefore, when the terminal moves in the core coverage area of the AP 2, the signal strength on the terminal side is always lower than −65 dB. As the terminal moves, the signal strength on the terminal side becomes lower.

It should be noted that a process shown in FIG. 5 to FIG. 7 is a process in which the control node generates the roaming steering behavior feature of the terminal, and steers, based on the roaming steering behavior feature of the terminal, the terminal to perform roaming. In a possible implementation, the first AP may alternatively generate the roaming steering behavior feature of the terminal, and steer, based on the roaming steering behavior feature of the terminal, the terminal to perform roaming. A process in which the first AP generates the roaming steering behavior feature of the terminal is similar to a process in which the control node generates the roaming steering behavior feature of the terminal. The process in which the first AP generates the roaming steering behavior feature of the terminal is not described in this embodiment. A difference between a process in which the first AP steers, based on the roaming steering behavior feature of the terminal, the terminal to perform roaming and a process in which the control node steers, based on the roaming steering behavior feature of the terminal, the terminal to perform roaming is that the first AP does not need to generate the roaming steering instruction, and does not need to steer, according to the roaming steering instruction, the terminal to perform roaming, but may steer, directly based on the steering protocol supported by the terminal, the terminal to roam from the first AP to the second AP. In a possible implementation, the first AP generates the roaming steering packet based on the steering protocol, and sends the roaming steering packet to the terminal. The terminal performs roaming based on the roaming steering packet.

Figure 9:
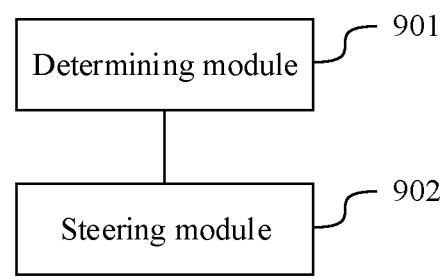
FIG. 9 is a schematic structural diagram of a terminal roaming steering apparatus according to an embodiment.

FIG. 9 is a schematic structural diagram of a terminal roaming steering apparatus according to an embodiment. The apparatus 900 includes: a determining module 901 configured to determine a steering protocol supported by a terminal, where the terminal is connected to a first access point AP, and the steering protocol is used to steer the terminal to perform roaming, where the determining module 901 is further configured to determine a second AP from at least one neighboring AP of the first AP; and a steering module 902 configured to steer, based on the steering protocol, the terminal to roam from the first AP to the second AP.

Optionally, the determining module 901 is configured to: for any neighboring AP in the at least one neighboring AP, when a network status of the first AP and a network status of the neighboring AP meet a network status indicated by network selection reference information of the terminal, determine the neighboring AP as the second AP, where the network selection reference information is used to indicate network statuses that the first AP and the second AP need to meet when the terminal performs roaming.

Optionally, the apparatus further includes: a first obtaining module configured to obtain network information of the first AP and network information of the at least one neighboring AP, where network information of one AP is used to indicate a network status of the AP.

Optionally, the first obtaining module is configured to: send an information obtaining request to each of the first AP and the at least one neighboring AP, where the information obtaining request is used to indicate the AP to return the network information to a control node; and receive the respective network information sent by the first AP and the at least one neighboring AP based on the information obtaining request.

Optionally, the information obtaining request includes address information of the terminal and an identifier of a signal measurement protocol supported by the terminal, and the signal measurement protocol is used to measure a signal strength between the AP and the terminal.

Optionally, the information obtaining request further includes a basic service set identifier BSSID of the first AP and an identifier of a channel of the first AP.

Optionally, the information obtaining request further includes a target quantity of measurement times, and the target quantity of measurement times is a quantity of times that measurement needs to be performed.

Optionally, the steering module 902 is configured to: steer the terminal to roam from the first AP to the second AP based on a parameter value that is of at least one target steering parameter in the steering protocol and that is applicable to the terminal.

Optionally, the apparatus further includes: a generation module configured to generate a roaming steering behavior feature of the terminal based on at least one of the steering protocol, the parameter value that is of the at least one target steering parameter and that is applicable to the terminal, the signal measurement protocol supported by the terminal, and the network selection reference information, where the roaming steering behavior feature is used to indicate a behavior feature of the terminal during roaming.

Optionally, the determining module 901 is further configured to: determine, based on the roaming steering behavior feature, a roaming occasion for steering the terminal to perform roaming.

Optionally, the determining module 901 is further configured to: determine at least one of the parameter value that is of the at least one target steering parameter and that is applicable to the terminal, the signal measurement protocol, and the network selection reference information.

Optionally, the determining module 901 is configured to: when a success rate of steering the terminal to complete roaming is greater than or equal to a target threshold based on a target parameter value set of the at least one target steering parameter, determine a target parameter value of each target steering parameter in the target parameter value set as a parameter value that is of each target steering parameter and that is applicable to the terminal, where the target parameter value set includes a target parameter value of each of the at least one target steering parameter.

The apparatus further includes: an obtaining module configured to obtain a motion state of the terminal and/or a service type of a service currently performed by the terminal.

The determining module 901 is further configured to determine, based on the motion state of the terminal and/or the service type of the service currently performed by the terminal, that the terminal needs to perform roaming.

Optionally, the determining module 901 is configured to: when the motion state of the terminal indicates that the terminal is moving away from the first AP, and/or the service type of the service currently performed by the terminal is a target service type, determine that the terminal needs to perform roaming.

Optionally, the apparatus is the control node, and the steering module 902 is configured to: send a roaming steering instruction to the first AP, where the roaming steering instruction is used to instruct the first AP to steer, based on the steering protocol, the terminal to roam from the first AP to the second AP.

Optionally, the roaming steering instruction includes the parameter value that is of the at least one target steering parameter in the steering protocol and that is applicable to the terminal.

Optionally, the roaming steering instruction includes an identifier of the second AP, an identifier of the steering protocol, and the address information of the terminal.

Optionally, the roaming steering instruction further includes network information of the second AP.

Optionally, the apparatus further includes: a sending module configured to send the information obtaining request to each of the first AP and the at least one neighboring AP, where the information obtaining request includes the address information of the terminal and the identifier of the signal measurement protocol supported by the terminal, and the signal measurement protocol is used to measure the signal strength between the AP and the terminal; and a receiving module configured to receive the respective network information sent by the first AP and the at least one neighboring AP based on the information obtaining request.

Optionally, the apparatus is the first AP.

Optionally, the network selection reference information includes at least one of signal strength reference information, load reference information, frequency band reference information, and bandwidth reference information; the signal strength reference information includes at least one of a source signal strength threshold, a target signal strength threshold, and a target signal strength difference; the target signal strength threshold is greater than or equal to the source signal strength threshold; the load reference information includes at least one of target channel utilization, a target channel utilization difference, and a target quantity of associated terminals; the frequency band reference information includes at least one of a target frequency band and a target frequency band range; and the bandwidth reference information includes at least one of a target channel bandwidth and a target channel bandwidth range.

Optionally, network information of one AP includes at least one of a signal strength between the AP and the terminal, channel utilization of the AP, a frequency band of the AP, a quantity of terminals associated with the AP, and a channel bandwidth of the AP.

Optionally, when the network status of the first AP and the network status of the neighboring AP meet at least one of the following, the network status of the first AP and the network status of the neighboring AP meet the network status indicated by the network selection reference information: a signal strength between the first AP and the terminal is less than or equal to the source signal strength threshold, and/or a signal strength between the neighboring AP and the terminal is greater than or equal to the target signal strength threshold; a signal strength between the first AP and the terminal is less than or equal to the source signal strength threshold, and a difference between a signal strength between the neighboring AP and the terminal and the signal strength between the first AP and the terminal is greater than or equal to the target signal strength difference; channel utilization of the neighboring AP is less than or equal to the target channel utilization; a signal strength between the neighboring AP and the terminal is greater than or equal to a signal strength between the first AP and the terminal, and a difference between channel utilization of the neighboring AP and channel utilization of the first AP is greater than or equal to the target channel utilization difference; a quantity of terminals connected to the neighboring AP is less than or equal to the target quantity of associated terminals; a frequency band of the first AP is less than or equal to the target frequency band, and a frequency band of the neighboring AP is greater than the target frequency band; a signal strength between the neighboring AP and the terminal is greater than or equal to a signal strength between the first AP and the terminal, and a frequency band range between a frequency band of the neighboring AP and a frequency band of the first AP is greater than or equal to the target frequency band range; a channel bandwidth of the first AP is less than or equal to the target channel bandwidth, and a channel bandwidth of the neighboring AP is greater than the target channel bandwidth; or a signal strength between the neighboring AP and the terminal is greater than or equal to a signal strength between the first AP and the terminal, and a channel bandwidth range between a channel bandwidth of the neighboring AP and a channel bandwidth of the first AP is greater than or equal to the target channel bandwidth range.

By using the apparatus, the steering protocol supported by the terminal and the second AP are determined, and the terminal is steered, based on the steering protocol supported by the terminal, to roam from the first AP to the second AP, to increase a success rate of terminal roaming. In addition, whether the terminal needs to perform roaming is determined based on the motion state of the terminal and the service type of the service currently performed by the terminal. The terminal is steered to perform roaming only when the terminal needs to perform roaming, to avoid impact of terminal roaming on a service performed by the terminal, so as to improve experience of a terminal user. In addition, the second AP is determined based on the network status of the first AP, a network status of the at least one neighboring AP, and the network selection reference information of the terminal, to prevent the determined second AP from not meeting a requirement of the network selection reference information, so as to further increase the success rate of terminal roaming.

All of the foregoing optional technical solutions may form optional embodiments of this disclosure through any combination. Details are not described herein again.

It should be noted that when terminal roaming is steered by using the terminal roaming steering apparatus provided in the foregoing embodiment, only division into the foregoing function modules is used as an example for description. In actual application, the foregoing functions can be allocated to different function modules and implemented based on a requirement. To be specific, an internal structure of the apparatus is divided into different function modules to implement all or some of the functions described above. In addition, the terminal roaming steering method embodiments provided in the foregoing embodiments pertain to a same concept. For a specific implementation process, refer to the method embodiments. Details are not described herein again.

A person of ordinary skill in the art may understand that all or some of the steps of the embodiments may be implemented by hardware or a program instructing related hardware. The program may be stored in a computer-readable storage medium, and the storage medium may include a read-only memory, a magnetic disk, a compact disc, or the like.

The foregoing descriptions are merely optional embodiments, but are not intended to limit this disclosure. Any modification, equivalent replacement, or improvement made without departing from the spirit and principle of this disclosure should fall within the protection scope of this disclosure.

What is claimed is:

1. A method implemented by a control node and comprising:
   determining a steering protocol supported by a terminal connected to a first access point (AP), wherein the steering protocol is for steering the terminal to perform roaming;
   obtaining network selection reference information of the terminal;
   determining a second AP from at least one neighboring AP that neighbors the first AP when a first network status of the first AP and a second network status of the second AP meet an indicated network status indicated by the network selection reference information, wherein the network selection reference information comprises frequency band reference information or bandwidth reference information; and
   steering, based on the steering protocol, the terminal to roam from the first AP to the second AP.

2. The method of claim 1, wherein the network selection reference information further comprises signal strength reference information or load reference information, wherein the signal strength reference information comprises a source signal strength threshold, a target signal strength threshold, or a target signal strength difference, wherein the target signal strength threshold is greater than or equal to the source signal strength threshold, wherein the load reference information comprises target channel utilization, a target channel utilization difference, or a target quantity of associated terminals, wherein the frequency band reference information comprises a target frequency band or a target frequency band range, and wherein the bandwidth reference information comprises a target channel bandwidth or a target channel bandwidth range.

3. The method of claim 2, wherein network information of an AP comprises at least one of a signal strength between the AP and the terminal, channel utilization of the AP, a frequency band of the AP, a quantity of terminals associated with the AP, or a channel bandwidth of the AP.

4. The method of claim 3, wherein when the first network status and the second network status meet at least one of the following, the first network status and the second network status meet the indicated network status:
   a first signal strength between the first AP and the terminal is less than or equal to the source signal strength threshold or a neighboring signal strength between the neighboring AP and the terminal is greater than or equal to the target signal strength threshold;
   the first signal strength is less than or equal to the source signal strength threshold and a difference between the neighboring signal strength and the first signal strength is greater than or equal to the target signal strength difference;
   neighboring channel utilization of the neighboring AP is less than or equal to the target channel utilization;
   the neighboring signal strength is greater than or equal to the first signal strength and a difference between the neighboring channel utilization and first channel utilization of the first AP is greater than or equal to the target channel utilization difference;
   a quantity of terminals connected to the neighboring AP is less than or equal to the target quantity;
   a first frequency band of the first AP is less than or equal to the target frequency band and a neighboring frequency band of the neighboring AP is greater than the target frequency band;
   the neighboring signal strength is greater than or equal to the first signal strength and a neighboring frequency band range between the neighboring frequency band and the first frequency band is greater than or equal to the target frequency band range;
   a first channel bandwidth of the first AP is less than or equal to the target channel bandwidth and a neighboring channel bandwidth of the neighboring AP is greater than the target channel bandwidth; or
   the neighboring signal strength is greater than or equal to the first signal strength and a channel bandwidth range between the neighboring channel bandwidth and the first channel bandwidth is greater than or equal to the target channel bandwidth range.

5. The method of claim 1, further comprising further steering the terminal based on a parameter value that is of at least one target steering parameter in the steering protocol and that is applicable to the terminal.

6. The method of claim 5, wherein before determining the second AP, the method further comprises generating a roaming steering behavior feature of the terminal based on at least one of the steering protocol, the parameter value, a signal measurement protocol supported by the terminal, or the network selection reference information, wherein the roaming steering behavior feature indicates a behavior feature of the terminal during roaming.

7. The method of claim 6, wherein after generating the roaming steering behavior feature, the method further comprises determining, based on the roaming steering behavior feature, a roaming occasion for steering the terminal.

8. The method of claim 6, wherein before generating the roaming steering behavior feature, the method further comprises determining at least one of the parameter value, the signal measurement protocol, or the network selection reference information.

9. The method of claim 8, further comprising further determining the parameter value when a success rate of steering the terminal is greater than or equal to a target threshold based on a target parameter value set of the at least one target steering parameter, wherein the target parameter value set comprises a target parameter value of each of the at least one target steering parameter.

10. The method of claim 1, further comprising:
obtaining a motion state of the terminal or a service type of a service currently performed by the terminal; and
determining, based on the motion state or the service type, that the terminal needs to perform roaming.

11. The method of claim 10, further comprising further determining that the terminal needs to perform roaming when the motion state indicates that the terminal is moving away from the first AP or the service type is a target service type.

12. The method of claim 1, wherein the method is executed by a control node, and wherein steering the terminal comprises sending a roaming steering instruction to the first AP, wherein the roaming steering instruction instructs the first AP to steer, based on the steering protocol, the terminal to roam from the first AP to the second AP.

13. The method of claim 12, wherein the roaming steering instruction comprises a parameter value that is of at least one target steering parameter in the steering protocol and that is applicable to the terminal.

14. The method of claim 12, wherein before determining the second AP, the method further comprises:
sending an information obtaining request to each of the first AP and the at least one neighboring AP, wherein the information obtaining request comprises address information of the terminal and an identifier of a signal measurement protocol supported by the terminal, and wherein the signal measurement protocol is for measuring a signal strength between the AP and the terminal; and
receiving, in response to the information obtaining request, network information from the first AP and the at least one neighboring AP.

15. The method of claim 1, wherein the method is executed by the first AP.

16. A control device comprising:
a memory configured to store instructions; and
a processor coupled to the memory and configured to execute the instructions to cause the control device to:
determine a steering protocol supported by a terminal connected to a first access point (AP), wherein the steering protocol is for steering the terminal to perform roaming,
obtain network selection reference information of the terminal,
determine a second AP from at least one neighboring AP that neighbors the first AP when a first network status of the first AP and a second network status of the second AP meet an indicated network status indicated by the network selection reference information, wherein the network selection reference information comprises frequency band reference information or bandwidth reference information, and
steer, based on the steering protocol, the terminal to roam from the first AP to the second AP.

17. The control device of claim 16, wherein the instructions, when executed by the processor, further cause the control device to further steer the terminal based on a parameter value that is of at least one target steering parameter in the steering protocol and that is applicable to the terminal.

18. The control device of claim 16, wherein the instructions, when executed by the processor, further cause the control device to:
obtain a motion state of the terminal or a service type of a service currently performed by the terminal; and
determine, based on the motion state or the service type, that the terminal needs to perform roaming.

19. A network device comprising:
a memory configured to store instructions; and
a processor coupled to the memory and configured to execute the instructions to cause the network device to:
determine a steering protocol supported by a terminal connected to a first access point (AP), wherein the steering protocol is for steering the terminal to perform roaming,
obtain network selection reference information of the terminal,
determine a second AP from at least one neighboring AP that neighbors the first AP when a first network status of the first AP and a second network status of the second AP meet an indicated network status indicated by the network selection reference information, wherein the network selection reference information comprises frequency band reference information or bandwidth reference information, and
steer, based on the steering protocol, the terminal to roam from the first AP to the second AP.

20. A computer program product comprising instructions that are stored on a non-transitory computer-readable medium and that, when executed by a processor, cause a control node to:
determine a steering protocol supported by a terminal connected to a first access point (AP), wherein the steering protocol is for steering the terminal to perform roaming;
obtain network selection reference information of the terminal;
determine a second AP from at least one neighboring AP that neighbors the first AP when a first network status of the first AP and a second network status of the second AP meet an indicated network status indicated by the network selection reference information, wherein the network selection reference information comprises frequency band reference information or bandwidth reference information; and
steer, based on the steering protocol, the terminal to roam from the first AP to the second AP.

* * * * *